United States Patent
Kim et al.

(10) Patent No.: US 10,944,754 B2
(45) Date of Patent: Mar. 9, 2021

(54) METHOD, AUTHENTICATION SERVER, AND ELECTRONIC DEVICE FOR CONFIGURING A SHARING TARGET DEVICE FOR SHARING DATA USAGE OF THE ELECTRONIC DEVICE

(71) Applicant: Samsung Electronics Co., Ltd., Gyeonggi-do (KR)

(72) Inventors: Sangbum Kim, Gyeonggi-do (KR); Juho Lee, Gyeonggi-do (KR); Hyewon Lee, Seoul (KR); Hyejin Lee, Seoul (KR); Heejeong Lee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 300 days.

(21) Appl. No.: 15/860,253

(22) Filed: Jan. 2, 2018

(65) Prior Publication Data
US 2018/0191728 A1    Jul. 5, 2018

(30) Foreign Application Priority Data
Jan. 2, 2017    (KR) .................. 10-2017-0000387

(51) Int. Cl.
*H04L 29/06* (2006.01)
*H04W 8/18* (2009.01)
(Continued)

(52) U.S. Cl.
CPC ......... *H04L 63/102* (2013.01); *H04B 1/3816* (2013.01); *H04L 63/0876* (2013.01);
(Continued)

(58) Field of Classification Search
CPC . H04L 63/102; H04L 63/126; H04L 63/0884; H04L 63/0876; H04L 63/104;
(Continued)

(56) References Cited

U.S. PATENT DOCUMENTS

| 8,407,764 B2 | 3/2013 | Kang et al. |
| 9,350,556 B1 | 5/2016 | Taly et al. |

(Continued)

FOREIGN PATENT DOCUMENTS

| CN | 103491183 | 1/2014 |
| KR | 1020130025070 | 3/2013 |

(Continued)

OTHER PUBLICATIONS

International Search Report dated Apr. 4, 2018 issued in counterpart application No. PCT/KR2018/000037, 3 pages.
(Continued)

*Primary Examiner* — Huan V Doan
(74) *Attorney, Agent, or Firm* — The Farrell Law Firm, P.C.

(57) ABSTRACT

Methods and electronic devices are provided for configuring a sharing target device. A method includes transmitting, to an authentication server associated with a mobile network operator for managing data usage, a device configuration request message for configuring the sharing target device to share a data usage amount assigned to the electronic device; receiving, from the authentication server, in response to the device configuration request message, an access code permitting access to the authentication server; and transmitting the received access code to the sharing target device, wherein the sharing target device receives, using the access code, a subscriber profile from the authentication server for sharing the data usage amount assigned to the electronic device.

12 Claims, 19 Drawing Sheets

(51) Int. Cl.
*H04B 1/3816* (2015.01)
*H04M 15/00* (2006.01)
*H04W 12/00* (2021.01)
*H04W 12/06* (2021.01)
*H04W 4/50* (2018.01)
*H04W 4/24* (2018.01)
*H04W 8/20* (2009.01)

(52) U.S. Cl.
CPC ........ *H04L 63/0884* (2013.01); *H04L 63/104* (2013.01); *H04L 63/126* (2013.01); *H04M 15/47* (2013.01); *H04M 15/58* (2013.01); *H04M 15/765* (2013.01); *H04M 15/7652* (2013.01); *H04W 4/24* (2013.01); *H04W 4/50* (2018.02); *H04W 8/18* (2013.01); *H04W 12/0023* (2019.01); *H04W 12/06* (2013.01); *H04W 8/205* (2013.01)

(58) Field of Classification Search
CPC .......... H04M 15/7652; H04M 15/765; H04M 15/47; H04M 15/58; H04B 1/3816; H04W 8/205; H04W 12/0023; H04W 12/06; H04W 4/50; H04W 4/24; H04W 8/18; H04W 12/00403
See application file for complete search history.

(56) References Cited

U.S. PATENT DOCUMENTS

| | | | |
|---|---|---|---|
| 9,357,380 B2 | 5/2016 | Oda et al. | |
| 9,655,114 B1* | 5/2017 | Reynolds | ............ H04L 41/0896 |
| 2002/0006111 A1* | 1/2002 | Akita | ................ H04Q 11/0062 370/235 |
| 2010/0162360 A1 | 6/2010 | Kang et al. | |
| 2013/0332723 A1 | 12/2013 | Tan et al. | |
| 2014/0136702 A1 | 5/2014 | Kwon et al. | |
| 2014/0162595 A1* | 6/2014 | Raleigh | ................... H04L 67/22 455/405 |
| 2014/0162622 A1 | 6/2014 | Oda et al. | |
| 2015/0365778 A1* | 12/2015 | Khan | ..................... H04W 8/18 455/419 |
| 2015/0382178 A1 | 12/2015 | Park et al. | |
| 2016/0020802 A1 | 1/2016 | Lee et al. | |
| 2016/0095017 A1* | 3/2016 | Ely | ....................... H04W 4/027 455/454 |
| 2016/0105540 A1 | 4/2016 | Kwon et al. | |
| 2016/0352923 A1 | 12/2016 | Nah et al. | |
| 2017/0149642 A1* | 5/2017 | Bastaldo-Tsampalis | .................... H04L 43/0894 |
| 2020/0296572 A1* | 9/2020 | Bachmutsky | ......... H04W 8/205 |

FOREIGN PATENT DOCUMENTS

| | | |
|---|---|---|
| KR | 1020140060181 | 5/2014 |
| KR | 10-2016-0002211 | 1/2016 |
| KR | 10-2016-0010239 | 1/2016 |
| KR | 10-2016-0040022 | 4/2016 |
| KR | 1020160139306 | 12/2016 |
| WO | WO 2016/171844 | 10/2016 |

OTHER PUBLICATIONS

European Search Report dated Dec. 10, 2019 issued in counterpart application No. 18734064.1-1213, 8 pages.
Chinese Office Action dated Sep. 3, 2020 issued in counterpart application No. 201880005711.4, 18 pages.

* cited by examiner

METHOD, AUTHENTICATION SERVER, AND ELECTRONIC DEVICE FOR CONFIGURING A SHARING TARGET DEVICE FOR SHARING DATA USAGE OF THE ELECTRONIC DEVICE

PRIORITY

This application claims priority under 35 U.S.C. § 119(a) to Korean Patent Application Serial No. 10-2017-0000387, which was filed in the Korean Intellectual Property Office on Jan. 2, 2017, the entire content of which is incorporated herein by reference.

BACKGROUND

1. Field of the Disclosure

The present disclosure relates generally to a method and an electronic device for configuring a sharing target device with which data usage is shared.

2. Description of the Related Art

A data sharing service or data tech service allows a data usage amount provided by a mobile network operator (MNO) to a first electronic device to be shared with a second electronic device, i.e., a sharing target device.

For example, a user purchasing an expensive handset at a discount rate may be locked in a service plan requiring excessive data usage for a long period of time. The user may wish to share some of the excessive data usage with family members or friends.

As another example, the user (such as a parent) may wish to provide share the data usage with a child who has exhausted the data usage assigned to their electronic device.

In addition, if a user has multiple electronic devices, the user may wish to share data usage among the multiple electronic devices.

To share data usage with a sharing target device, the user of the electronic device may have to visit an agent of the MNO in person. After authenticating the user, the agent installs a data sharing universal subscriber identity module (USIM) in the sharing target device. The user can then share the data usage of the electronic device with the sharing target device.

However, the user may be inconvenienced by having to visit the agent of the MNO in person. For example, the user may have to visit the MNO's agent whenever the sharing target device is to be configured or replaced.

SUMMARY

The present disclosure has been made to address at least the above mentioned problems and/or disadvantages and to provide at least the advantages described below.

Accordingly, an aspect of the present disclosure is to provide an electronic device and method that allow a user to configure or replace a sharing target device without visiting an offline agent.

Another aspect of the present disclosure is to provide an electronic device and method that allow a user of the electronic device to monitor data utilization of a sharing target device, which shares the data usage of the electronic device.

Another aspect of the present disclosure is provide an electronic device and method that allow a user to readily recognize whether data usage of a sharing target device is manipulated or an application related thereto is deleted.

In accordance with an aspect of the present disclosure, a method is provided for an electronic device to configure a sharing target device for data sharing. The method includes transmitting, to an authentication server associated with a mobile network operator for managing data usage, a device configuration request message for configuring the sharing target device to share a data usage amount assigned to the electronic device; receiving, from the authentication server, in response to the device configuration request message, an access code permitting access to the authentication server; and transmitting the received access code to the sharing target device. The sharing target device receives, using the access code, a subscriber profile from the authentication server for sharing the data usage amount assigned to the electronic device.

In accordance with another aspect of the present disclosure, a method is provided for a sharing target device, which shares a data usage amount of an electronic device, to receive a mobile communication service. The method includes receiving an access code, which permits access to an authentication server associated with a mobile network operator managing data usage, from the electronic device or the authentication server; transmitting the received access code to the authentication server; receiving, based on the access code, a subscriber profile from the authentication server; storing the received subscriber profile in a profile storage module; and sharing, based on the stored subscriber profile, the data usage amount assigned to the electronic device.

In accordance with another aspect of the present disclosure, a method is provided for a sharing target device, which shares a data usage amount of an electronic device, to receive a mobile communication service. The method includes transmitting, to an authentication server associated with a mobile network operator for managing data usage, a device configuration request message for configuring the sharing target device to share the data usage amount assigned to the electronic device; receiving, when authentication of the sharing target device is performed between the electronic device and the authentication server based on the device configuration request message, a subscriber profile from the authentication server; storing the received subscriber profile in a profile storage module; and sharing, based on the stored subscriber profile, the data usage amount assigned to the electronic device.

In accordance with another aspect of the present disclosure, a method is provided for an authentication server associated with a mobile network operator to provide a subscriber profile. The method includes receiving, from an electronic device or a sharing target device, a device configuration request message for configuring the sharing target device to share a data usage amount assigned to the electronic device; transmitting, in response to the device configuration request message, an access code, which permits the sharing target device to access the authentication server, to the electronic device or the sharing target device; receiving the access code from the sharing target device; and transmitting, in response to the received access code, the subscriber profile to the sharing target device.

In accordance with another aspect of the present disclosure, a method is provided for an authentication server associated with a mobile network operator to provide a subscriber profile. The method includes receiving, from a sharing target device, a device configuration request message for configuring the sharing target device to share a data usage amount assigned to an electronic device; transmitting, in response to the device configuration request message, a device configuration verification request message for confirming configuration of the sharing target device to the electronic device; receiving, when the configuration of the sharing target device is verified by the electronic device based on the device configuration verification request message, a device configuration verification confirmation message from the electronic device; and transmitting, in response to the received device configuration verification confirmation message, the subscriber profile to the sharing target device.

In accordance with another aspect of the present disclosure, an electronic device is provided for sharing a data usage amount with a sharing target device. The electronic device includes a processor; a transceiver configured to communicate with an authentication server associated with a mobile network operator for managing data usage; and a memory, which stores instructions, which when executed, instruct the processor to transmit, to the authentication server through the transceiver, a device configuration request message for configuring the sharing target device to share the data usage amount assigned to the electronic device; receive, from the authentication server through the transceiver, in response to the device configuration request message, an access code permitting access to the authentication server; and transmit the received access code to the sharing target device through the transceiver, wherein the sharing target device, using the access code, receives a subscriber profile from the authentication server for sharing the data usage amount assigned to the electronic device.

In accordance with another aspect of the present disclosure, a sharing target device is provided, which shares a data usage amount assigned to an electronic device. The sharing target device includes a processor; a transceiver configured to communicate with the electronic device and an authentication server associated with a mobile network operator for managing data usage; a profile storage module configured to store a subscriber profile; and a memory that stores instructions, which when executed, instruct the processor to receive, from the electronic device or the authentication server through the transceiver, an access code permitting access to the authentication server; transmit the received access code to the authentication server through the transceiver; receive, based on the access code, a subscriber profile from the authentication server through the transceiver; store the received subscriber profile in the profile storage module; and share, based on the stored subscriber profile, the data usage amount assigned to the electronic device.

In accordance with another aspect of the present disclosure, a sharing target device is provided, which shares a data usage amount assigned to an electronic device. The sharing target device includes a processor; a transceiver configured to communicate with an authentication server associated with a mobile network operator for managing data usage; a profile storage module configured to store a subscriber profile; and a memory that stores instructions, which when executed, instruct the processor to transmit, to the authentication server, through the transceiver, a device configuration request message for configuring the sharing target device to share the data usage amount assigned to the electronic device; receive, when authentication of the sharing target device is performed between the electronic device and the authentication server based on the device configuration request message, a subscriber profile from the authentication server through the transceiver; store the received subscriber profile in the profile storage module; and share, based on the stored subscriber profile, the data usage amount assigned to the electronic device.

In accordance with another aspect of the present disclosure, an authentication server, which is associated with a mobile network operator, is provided. The authentication server includes a processor; a transceiver configured to communicate with an electronic device and a sharing target device; and a memory that stores instructions, which when executed, instruct the processor to receive, from the electronic device or the sharing target device through the transceiver, a device configuration request message for configuring the sharing target device to share a data usage amount assigned to the electronic device; transmit, to the electronic device or the sharing target device through the transceiver, in response to the device configuration request message, an access code, which permits the sharing target device to access the authentication server; receive the access code from the sharing target device through the transceiver; and transmit, in response to the received access code, a subscriber profile to the sharing target device.

In accordance with another aspect of the present disclosure, an authentication server, which is associated with a mobile network operator, is provided. The authentication server includes a processor; a transceiver configured to communicate with an electronic device and a sharing target device; and a memory that stores instructions, which when executed, instruct the processor to receive, from the sharing target device through the transceiver, a device configuration request message for configuring the sharing target device to share a data usage amount assigned to the electronic device; transmit, to the electronic device through the transceiver, in response to the device configuration request message, a device configuration verification request message for confirming configuration of the sharing target device; receive, when the configuration of the sharing target device is verified by the electronic device based on the device configuration verification request message, a device configuration verification confirmation message from the electronic device through the transceiver; and transmit, in response to the received device configuration verification confirmation message, a subscriber profile to the sharing target device.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Figure 1:
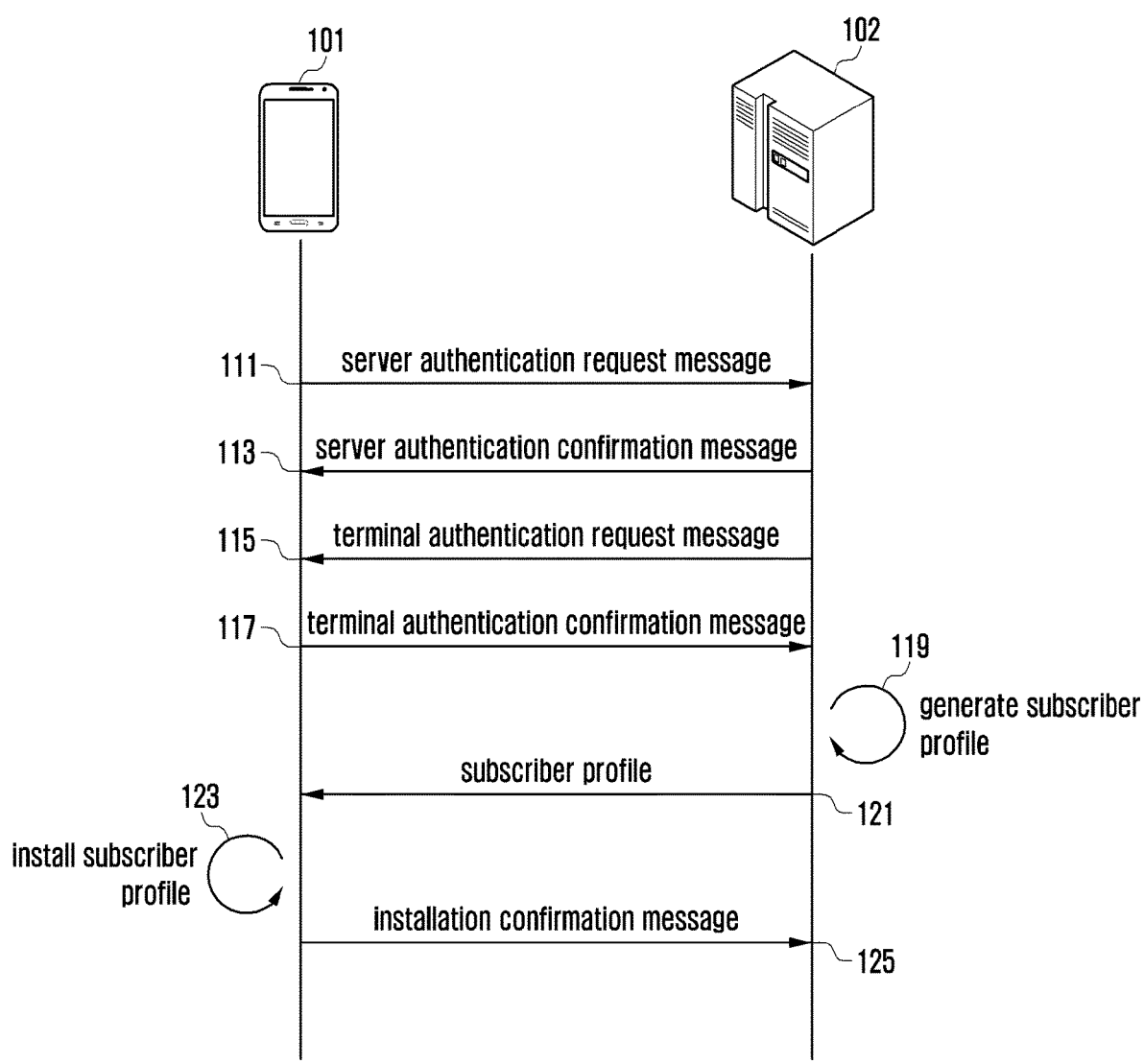
FIG. 1 is a signal flow diagram illustrating a process of installing a subscriber profile in an electronic device according to embodiment of the present disclosure.

Hereinafter, various embodiments of the present disclosure are described in detail with reference to the accompanying drawings. However, the present description is not limited to these specific embodiments, and all modifications, equivalents and/or alternatives thereof also belong to the scope of the present disclosure. The same or similar reference symbols may be used herein to refer to the same or like parts.

The expressions and terms, including technical and scientific terms, used herein have the same meaning as commonly understood by one of ordinary skill in the art. Terms, such as those defined in commonly used dictionaries, should be interpreted as having a meaning that is consistent with their meaning in the context of the relevant art and will not be interpreted in an idealized or overly formal sense unless expressly so defined herein. In any case, the terms defined herein should not be interpreted to exclude certain embodiments of the present disclosure.

Herein, the expressions "have", "may have", "include" or "may include" indicate the existence of a specific feature (e.g., a number, a function, an operation, or a component) but do not exclude the existence of other features.

The expressions "A or B", "at least one of A and/or B", or "one or more of A and/or B" may indicate all possible combinations of A and B. For example, "A or B", "at least one of A and B", and "at least one of A or B" may indicate any of (1) at least A, (2) at least B, or (3) at least A and at least B.

The terms "1$^{st}$", "first", "2$^{nd}$", or "second" may be used modify corresponding components regardless of importance or order and to distinguish a component from another without limiting the components. For example, a first user device and a second user device may indicate different user devices regardless of the order or importance of the devices. As another example, a first component may be referred to as a second component, and vice versa, without departing from the scope of the present disclosure.

When a first element is referred to as being "coupled with/to" or "connected with/to" a second element, the first element can be coupled or connected with/to the second element directly or via a third element. In contrast, when a first element is referred to as being "directly coupled with/to" or "directly connected with/to" a second element, no other element intervenes between the first element and the second element.

The phrase "configured (or set) to" may be used interchangeably with phrases such as "suitable for", "having the capacity to", "designed to", "adapted to", "made to" and "capable of", depending on context.

The term "configured (or set) to" does not necessarily mean "specifically designed in hardware to." Rather, "configured to" may indicate that a device can perform a specific operation together with other devices or parts. For example, a "processor configured (or set) to perform A, B, and C" may refer to a dedicated processor (e.g., an embedded processor) for performing the operations or a general-purpose processor (e.g., a central processing unit (CPU) or an application processor (AP)) that may perform the operations by executing one or more software programs stored in a memory unit.

Some terms used herein may be provided merely to describe a specific embodiment without limiting the scope of another embodiment.

The singular forms "a", "an", and "the" are intended to include the plural forms as well, unless the context clearly indicates otherwise.

The terms "module" and "unit" may refer to a certain unit that includes one of hardware, software and firmware or any combination thereof. The term "module" may be interchangeably used with "unit", "logic", "logical block", "component", or "circuit". A module may be the minimum unit of a single-bodied component or a part thereof. A module may be the minimum unit, or a part thereof, which performs one or more particular functions. A module may be realized mechanically or electronically. For example, a module may include at least one of an application-specific integrated circuit (ASIC) chip, a field-programmable gate array (FPGA), and a programmable-logic device, which have been known or are to be developed in the future.

Herein, an electronic device or a sharing target device may be a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, a mobile medical instrument, a camera, or a wearable device (e.g., smart glasses, a head-mounted device (HMD), electronic clothes, an electronic bracelet, an electronic necklace, an electronic appcessory, an electronic tattoo, a smart mirror, or a smart watch).

An electronic device or a sharing target device may also be a smart home appliance, such as a television (TV), a digital video disc (DVD) player, audio equipment, a refrigerator, an air conditioner, a vacuum cleaner, an oven, a microwave oven, a washing machine, an air cleaner, a set-top box, a home automation control panel, a security control panel, a TV box (e.g., a Samsung HomeSync™, an Apple TV™, or a Google TV™), a game console (e.g., an Xbox™ or a PlayStation™), an electronic dictionary, an electronic key, a camcorder, or an electronic picture frame.

An electronic device or a sharing target device may also be a medical device (e.g., a portable medical measuring device such as a blood sugar measuring device, a heartbeat measuring device, a blood pressure measuring device, or a body temperature measuring device), a magnetic resonance angiography (MRA) system, a magnetic resonance imaging (MRI) system, a computed tomography (CT) system, a radiograph instrument, an ultrasonography instrument, a navigation device, a global positioning system (GPS) receiver, an event data recorder (EDR), a flight data recorder (FDR), a car infotainment device, a ship electronic equipment (e.g., a marine navigation system or a gyrocompass), avionics, security equipment, a car head unit, or an industrial or home robot, an automatic teller machine (ATM), a point of sales (POS) device, or an IoT device (e.g., a bulb, a sensor, an electricity or gas meter, a sprinkler, a fire alarm, a thermostat, a street light, a toaster, fitness equipment, a hot water tank, a heater, or a boiler).

An electronic device or a sharing target device may also be a piece of furniture, a part of a building, a structure, an electronic board, an electronic signature receiving device, a projector, or a measurement instrument (e.g., a water meter, an electricity meter, a gas meter, or a wave meter).

An electronic device or a sharing target device may also be a flexible electronic device.

An electronic device or a sharing target device may also be a combination of the above-listed devices. However, an electronic device or a sharing target device is not limited to the above-listed devices, and may be a new electronic device to be developed according to advances in technology.

Herein, the term "user" may denote a human or another device (e.g., an artificial intelligence electronic device) using the electronic device.

As described above, when a conventional USIM card is used for data usage sharing, a user has to visit an agent of an MNO in person to register or change a sharing target device.

In accordance with an embodiment of the present disclosure, a scheme is provided for registering or changing a sharing target device by using an embedded universal integrated circuit card (eUICC) or an embedded subscriber identity module (eSIM) (hereinafter, collectively referred to as "an eSIM module").

Unlike existing removable cards such as a SIM card, a USIM card, and a UICC, at the time of manufacturing, an eSIM module is mounted as a chip inside an electronic device that performs mobile communication, making it difficult to remove the eSIM module. Using the eSIM module, a user can subscribe to, change, or unsubscribe from a mobile communication service through over the air (OTA) operations, without visiting an agent of the MNO.

An eSIM module without subscription information may be included in an electronic device and can be sold to a specific user. The user can connect to the MNO network, download a subscriber profile (e.g., an MNO profile) including subscription information through OTA, and install the subscriber profile in the eSIM module. A procedure for downloading and installing a subscriber profile in the eSIM module is commonly referred to as "provisioning". The subscriber profile may be delivered to the eSIM module through an authentication server such as the subscription manager data preparation (SM-DP) or a subscription manager secure routing (SM-SR), and may later be changed or deleted through the authentication server.

For OTA-based provisioning, the electronic device should be able to access a mobile communication network for downloading a subscriber profile before subscribing to a mobile communication service. In general, when an electronic device is sold, a provisioning profile may be included in the eSIM module so that the electronic device can access the mobile communication network before downloading an initial subscriber profile. The electronic device may access the mobile communication network using the provisioning profile to download and install the initial subscriber profile.

Although embodiments of the present disclosure are described with reference to an eSIM module, the present disclosure is not limited thereto and is also applicable to an electronic device or a sharing target device capable of OTA-based provisioning.

FIG. 1 is a signal flow diagram illustrating a process of installing a subscriber profile in an electronic device according to an embodiment of the present disclosure.

Referring to FIG. 1, an authentication server 102 associated with an MNO manages data usage of an electronic device 101, e.g., a smartphone. The authentication server 102 may include at least one of a profile generation server, a provisioning support server, and a profile management server.

The profile generation server, such as an SM-DP, can generate a profile to be installed in an eSIM module, based on information received from the MNO or the eSIM manufacturer. The profile generation server can transfer the generated profile to the provisioning support server or the profile management server. To securely transmit the generated profile, the profile generation server may perform authentication with the server to which the profile is to be forwarded.

The provisioning support server may receive the profile generated by the profile generation server. For example, the provisioning support server may receive a plurality of packets (e.g., application protocol data units (APDUs)) corresponding to a profile from the profile generation server. The provisioning support server may receive a plurality of packets corresponding to a plurality of profiles in bulk, from the profile generation server, through a dedicated line.

The provisioning support server may generate a profile in the form of an uncompressed image file from a plurality of received packets. The provisioning support server may send the generated image file to the electronic device 101. In addition to the subscriber profile, the provisioning support server may download and install a test profile in the electronic device 101 for development or verification.

The profile management server, such as the SM-SR, can perform overall management of the eSIM module embedded in the electronic device 101. For example, the profile management server can perform profile management functions for the eSIM module, such as profile installation, deletion, enablement, and disablement.

In step 111, for server authentication, the electronic device 101 including the eSIM module transmits a server authentication request message to the authentication server 102.

After performing authentication based on the server authentication request message, the authentication server 102 transmits a server authentication confirmation message to the electronic device 101 in step 113.

For terminal authentication, in step 115, the authentication server 102 transmits a terminal authentication request message to the electronic device 101. Although illustrated separately, steps 113 and 115 may be performed in parallel, or step 115 may be performed prior to step 113.

After performing authentication based on the terminal authentication request message, the electronic device 101 transmits a terminal authentication confirmation message to the authentication server 102 in step 117.

In step 119, the authentication server 102 generates a subscriber profile. For example, the subscriber profile may be generated based on at least one of subscription information of the user, an eSIM-identifier (ID), an integrated circuit card ID (ICCID), and an SM-SR ID (or SRID). The subscriber profile may represent a set of subscriber information or a collection of files, data, and applications associated with a particular subscriber of the MNO.

In step 121, the authentication server 102 transmits the generated subscriber profile to the electronic device 101. For example, the authentication server 102 may transmit an encrypted subscriber profile to the electronic device 101.

In step 123, the electronic device 101 installs the received subscriber profile in the eSIM module.

In step 125, the electronic device 101 transmits an installation confirmation message indicating that the subscriber profile has been installed to the authentication server 102.

Thereafter, based on the subscriber profile, the electronic device 101 may use a mobile communication service provided through the network of the MNO.

Figure 2:
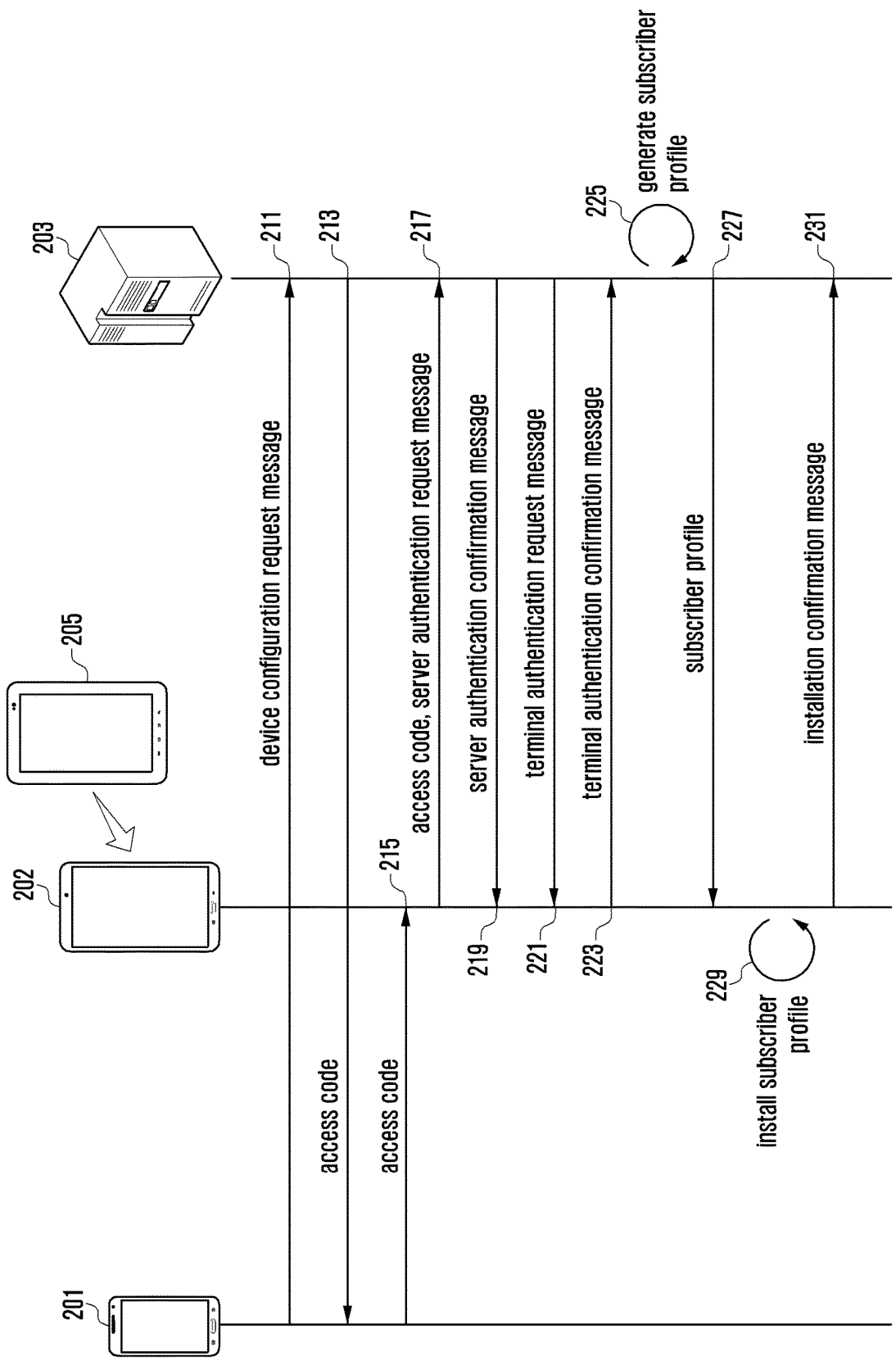
FIGS. 2 to 4 are signal flow diagrams illustrating processes of configuring a sharing target device for data sharing according to embodiments of the present disclosure.

FIG. 2 is a signal flow diagram illustrating a process of configuring a sharing target device for data sharing according to an embodiment of the present disclosure.

Referring to FIG. 2, a user uses electronic devices 201 and 205. Among the electronic devices 201 and 205, the electronic device 201 may be allocated a data usage amount by an MNO, and the electronic device 205 may be a sharing target device that shares the data usage amount, based on the data sharing service described above.

The user may wish to replace the existing sharing target device 205 with a new sharing target device 202, e.g., because of insufficient resources or because the existing sharing target device 205 is lost.

When a trigger signal for replacing the existing sharing target device 205 with the new sharing target device 202 is generated, the electronic device 201 transmits a device configuration request message for changing the sharing target device to the authentication server 203 associated with the MNO in step 211. The device configuration request message may include identification information (e.g., a MAC address or access information) of the sharing target device 202.

The trigger signal may be generated by a user input for replacing the existing sharing target device 205 with the new sharing target device 202 through an application (e.g., an application provided by the MNO) installed in the electronic device 201. For example, the trigger signal may be generated when the user enters a user ID and password and specifies a data usage amount to be shared through the application. As another example, the trigger signal may be automatically generated when a direct connection is established between the electronic device 201 and the new sharing target device 202.

Figure 5:
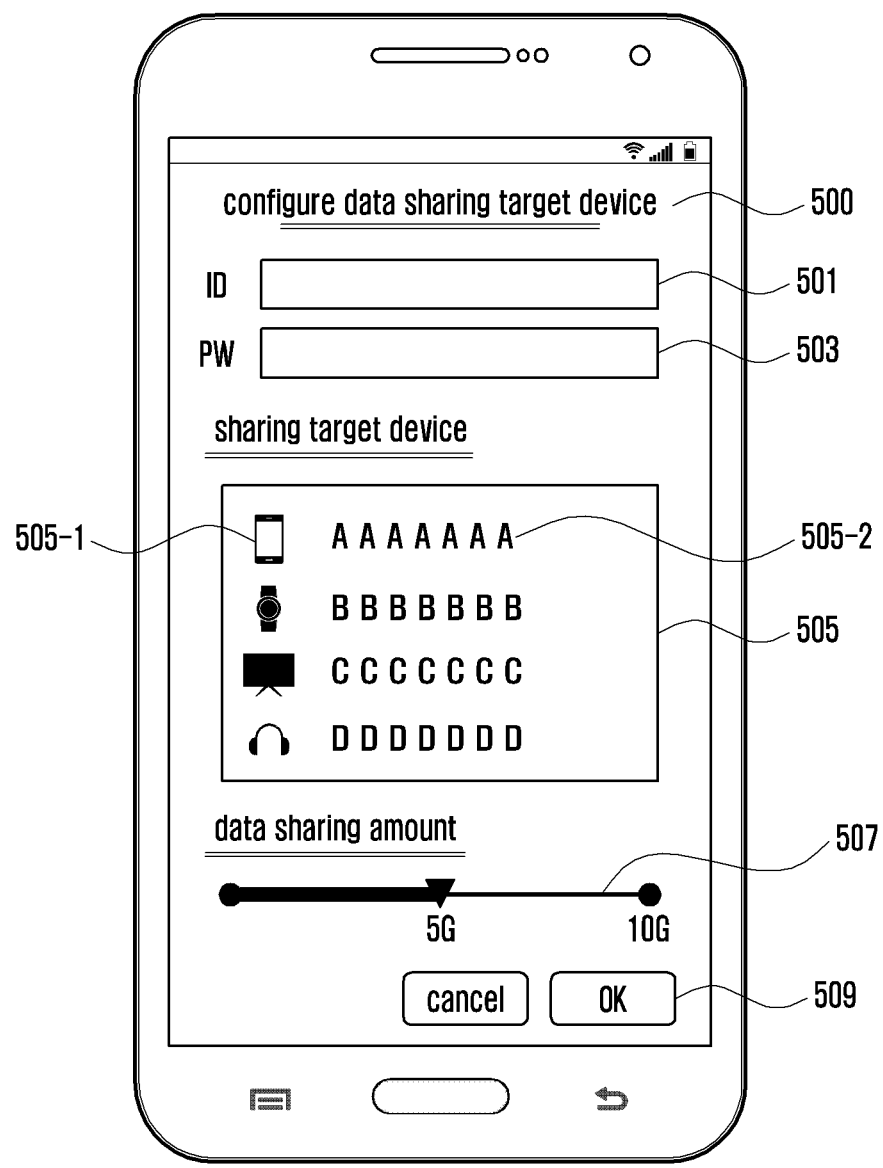
FIG. 5 illustrates an example screen for configuring a sharing target device for data sharing according to an embodiment of the present disclosure.

FIG. 5 illustrates an example screen for configuring a sharing target device for data sharing according to an embodiment of the present disclosure.

Referring to FIG. 5, the electronic device provides a user interface (UI) window 500 for configuring a sharing target device. The UI window 500 includes UI elements, i.e., an ID field 501, a password field 503, a region 505 for selecting a sharing target device, and a slider 507 for specifying the data sharing amount of the selected sharing target device 505-1. The maximum data sharing amount may be the default data usage amount assigned to the electronic device 201.

When the user selects the OK button 509, after entering a user ID and password and specifying the sharing target device 505-1 and the data sharing amount, a trigger signal may be generated according to the user input.

Accordingly, the device configuration request message (e.g., as transmitted in step 211 of FIG. 2) may include identification information 505-2 (e.g., a MAC address or access information) of the sharing target device 505-1.

Referring again to FIG. 2, upon reception of the device configuration request message, the authentication server 203 transmits an access code for authentication server access to the electronic device 201, based on the device configuration request message, in step 213.

Upon reception of the access code, the electronic device 201 forwards the received access code to the new sharing target device 202 in step 215.

The access code may include data request information requesting assignment of at least a portion of the data usage amount assigned to the electronic device 201. Specifically, the access code may include information indicating that the server authentication request message to be transmitted by the sharing target device 202 does not request data usage allocation for a new service plan, but requests allocation of at least a portion of the data usage amount having already been allocated to the electronic device 201.

The access code may include a phone number given to the electronic device 201 or a unique number (e.g., a MAC address) of the electronic device 201 as identification information. The access code may include a user ID and a password for accessing the server of the MNO as user information of the electronic device 201. The access code may include a provisioning profile enabling access to the mobile communication network prior to downloading a subscriber profile.

The access code may be a quick response (QR) code or a bar code. The sharing target device 202 may obtain the access code by capturing the QR code or barcode displayed on the electronic device 201.

Upon reception of the access code, the sharing target device 202 transmits a server authentication request message for server authentication together with the access code to the authentication server 203 in step 217.

After performing authentication based on the access code and the server authentication request message, the authentication server 203 transmits a server authentication confirmation message to the sharing target device 202 in step 219.

In step 221, the authentication server 203 transmits a terminal authentication request message for terminal authentication to the sharing target device 202.

After performing authentication based on the terminal authentication request message, the sharing target device 202 transmits a terminal authentication confirmation message to the authentication server 203 in step 223.

After completion of authentication between the sharing target device 202 and the authentication server 203, the authentication server 203 generates a subscriber profile in step 225. The subscriber profile may include the phone number assigned to the sharing target device 202. For management, this phone number may be paired with the phone number assigned to the electronic device 201.

In step 227, the authentication server 203 transmits the generated subscriber profile to the sharing target device 202.

In step 229, the sharing target device 202 installs the received subscriber profile in the profile storage module, e.g., an eSIM module.

After installation of the subscriber profile, the sharing target device 202 transmits an installation confirmation message indicating that the subscriber profile has been installed to the authentication server 203 in step 231.

Thereafter, based on the subscriber profile, the sharing target device 202 can receive a mobile communication service corresponding to the data usage amount shared with the electronic device 201.

The authentication server 203 may transmit the generated subscriber profile to the sharing target device 202 via the electronic device 201. The process of the electronic device 201 receiving the profile for the sharing target device 202 and forwarding it to the sharing target device 202 is applicable to other embodiments of the present disclosure.

Figure 3:
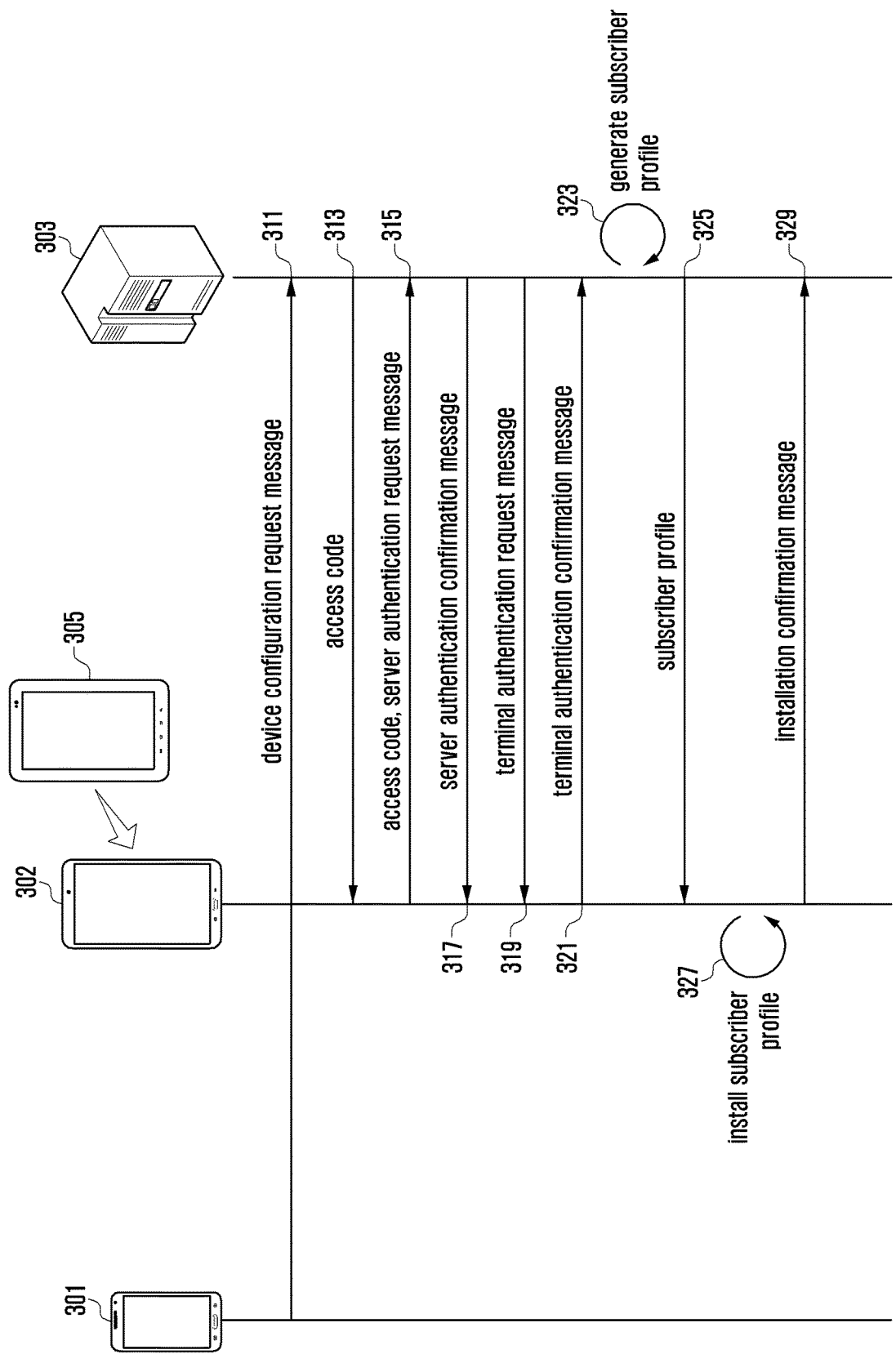

FIG. 3 is a signal flow diagram illustrating a process of configuring a sharing target device for data sharing according to an embodiment of the present disclosure. Because steps 317 to 329 correspond to steps 219 to 231 of FIG. 2, a repeated description thereof is omitted below.

Referring to FIG. 3, similar to FIG. 2, a user may wish to replace an existing sharing target device 305 with a new sharing target device 302.

When a trigger signal for replacing the existing sharing target device 305 with the new sharing target device 302 is generated, an electronic device 301 transmits, to an authentication server 303 associated with an MNO, a device configuration request message for changing the sharing target device in step 311.

Upon reception of the device configuration request message, the authentication server 303 transmits an access code for authentication server access directly to the sharing target device 302, based on the device configuration request message, in step 313.

Upon reception of the access code, the sharing target device 302 transmits a server authentication request message for server authentication together with the access code to the authentication server 303 in step 315.

After completion of authentication between the sharing target device 302 and the authentication server 303, the authentication server 303 generates a subscriber profile and transmits the generated subscriber profile to the sharing target device 302 in steps 317 to 329.

Thereafter, based on the subscriber profile, the sharing target device 302 can receive a mobile communication service.

Figure 4:
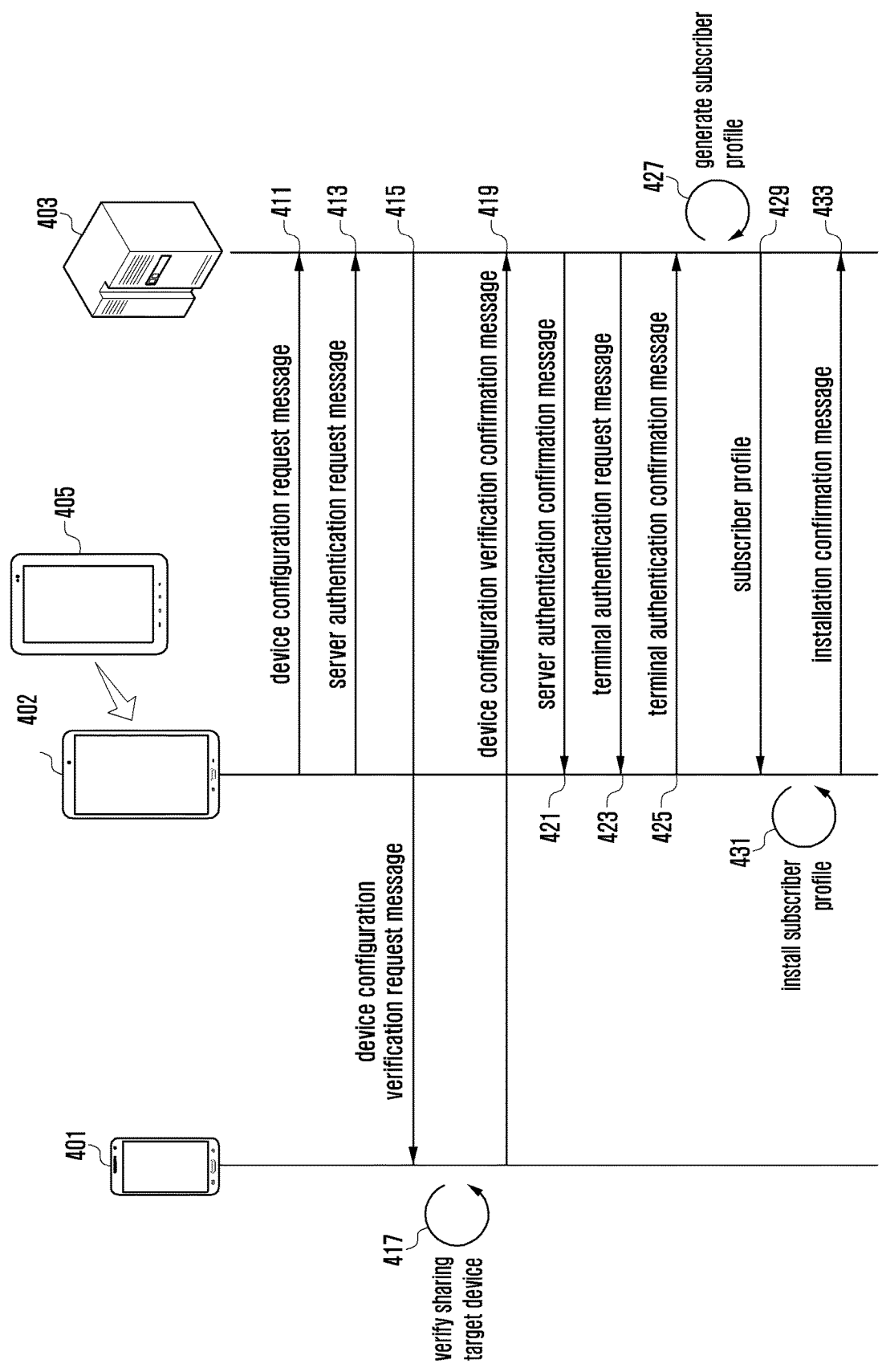

FIG. 4 is a signal flow diagram illustrating a process of configuring a sharing target device for data sharing according to an embodiment of the present disclosure. Because steps 421 to 433 correspond to steps 219 to 231 of FIG. 2, a repeated description thereof is omitted below.

Referring to FIG. 4, similar to FIGS. 2 and 3, a user of an electronic device 401 may wish to replace an existing sharing target device 405 with a new sharing target device 402.

When a trigger signal for replacing the existing sharing target device 405 with the new sharing target device 402 is generated, the sharing target device 402 transmits, to an authentication server 403 associated with an MNO, a device configuration request message for configuring the sharing target device in step 411.

The trigger signal may be generated by a user input for changing the sharing target device through an application (e.g., an application provided by the MNO) installed in the sharing target device 402.

For example, the trigger signal may be generated when the user enters the user ID and password and specifies a data usage amount to be shared through the application, or may be automatically generated when a direct connection is established between the electronic device 401 and the new sharing target device 402.

The device configuration request message may include identification information or user information of the electronic device 401. The device configuration request message may also include identification information of the sharing target device 402.

In step 413, the sharing target device 402 transmits a server authentication request message for server authentication to the authentication server 403. Alternatively, step 413 may be performed before or in parallel with step 411.

In step 415, to verify change of the sharing target device, the authentication server 403 transmits a device configuration verification request message to the electronic device 401. The device configuration verification request message may include at least one of user information and identification information of the electronic device 401 and the sharing target device 402 received from the sharing target device 402.

In step 417, based on the received device configuration verification request message, the electronic device 401 verifies whether the sharing target device 402 is capable of sharing data usage of the electronic device 401.

After verification of the sharing target device 402, the electronic device 101 transmits a device configuration verification confirmation message to the authentication server 402 in step 419.

Based on the device configuration verification confirmation message, the authentication server 403 transmits a server authentication confirmation message, in response to the server authentication request message, in step 421.

When the sharing target device 402 is authenticated in steps 423 and 425, the authentication server 403 transmits a subscriber profile to the sharing target device 402 in steps 427 and 429.

Thereafter, based on the subscriber profile in steps 431 and 433, the sharing target device 402 may receive a mobile communication service.

Figure 6:
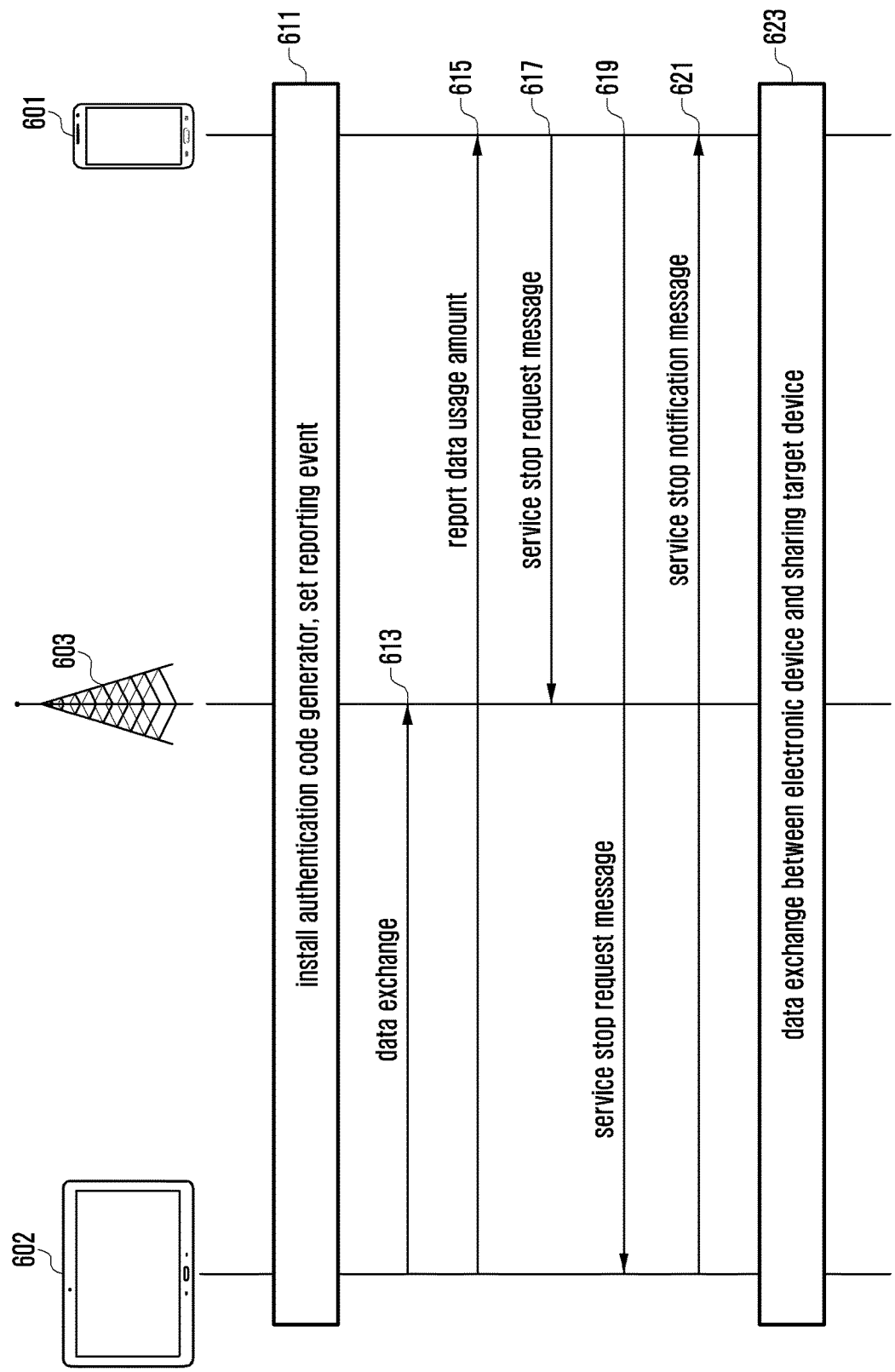
FIGS. 6 and 7 are signal flow diagrams illustrating processes of limiting data usage of a sharing target device according to of the present disclosure.

FIG. 6 is a signal flow diagram illustrating a process of limiting data usage of a sharing target device according to an embodiment of the present disclosure.

Referring to FIG. 6, data usage of an electronic device 601 can be shared with a sharing target device 602 through a data sharing service.

A user of the electronic device 601 and a user of the sharing target device 602 may be different. For example, the user of the electronic device 601 may be a parent, and the user of the sharing target device 602 may be a child who is allowed to consume a portion of the data usage amount of the parent. The user of the electronic device 601 may monitor the data usage of the sharing target device 602 and attempt to limit the data usage of the sharing target device 602, if the sharing target device 602 uses an excessive amount of data.

In step 611, an authentication code generator for authenticating notification information may be installed in at least one of the electronic device 601 and the sharing target device 602. The notification information may include information on the data usage amount and the data usage state of the sharing target device 602.

The electronic device 601 and the sharing target device 602 may each generate an authentication code of the same value on a periodic basis. For synchronization of the authentication code, the authentication code of the electronic device 601 and the authentication code of the sharing target device 602 may be updated at regular intervals. Alternatively, when the authentication code is updated in one of the electronic device 601 and the sharing target device 602, the update time information may be transferred to the other device so that the other device can generate an authentication code based on the received update time information.

The authentication code generator of one of the electronic device 601 and the sharing target device 602 may generate an encryption key and a decryption key and transmit the decryption key to the other device.

In addition, the user may set a reporting event for sending notification information using at least one of the electronic device 601 and the sharing target device 602 in step 611.

For example, when a dedicated application for monitoring data usage is installed in at least one of the electronic device 601 and the sharing target device 602, the user can set a data usage rule generating notification information according to data use of the sharing target device 602 through a window of the dedicated application. The data usage rule can be set so that a notification message is sent from the sharing target device 602 to the electronic device 601 when the cumulative data usage amount of the sharing target device 602 exceeds a preset value (e.g., 1 GB) or whenever the data usage amount thereof exceeds a preset value (e.g., 100 MB).

After setting the reporting event, data is transmitted/received between the sharing target device 602 and the base station 603, based on the data sharing agreement between the electronic device 601 and the sharing target device 602, in step 613.

Thereafter, when the data usage amount of the sharing target device 602 exceeds a threshold set according to the data usage rule specified in step 611, or when the electronic device 601 requests the sharing target device 602 to report the data usage amount of the sharing target device 602, the sharing target device 602 reports the data usage amount to the electronic device 601 in step 615.

For example, the sharing target device 602 may transmit a text message containing notification information on the data usage amount to the electronic device 601.

The sharing target device 602 may transmit the notification information and an authentication code together. That is, the user of the sharing target device 602, e.g., a child who does not want to report the correct data usage, may send a message including a false data usage amount to the electronic device 601. To prevent this, an authentication code may be provided together for verifying the validity of the notification information. The authentication code may be a value generated by the authentication code generator of the sharing target device 602.

Figure 8:
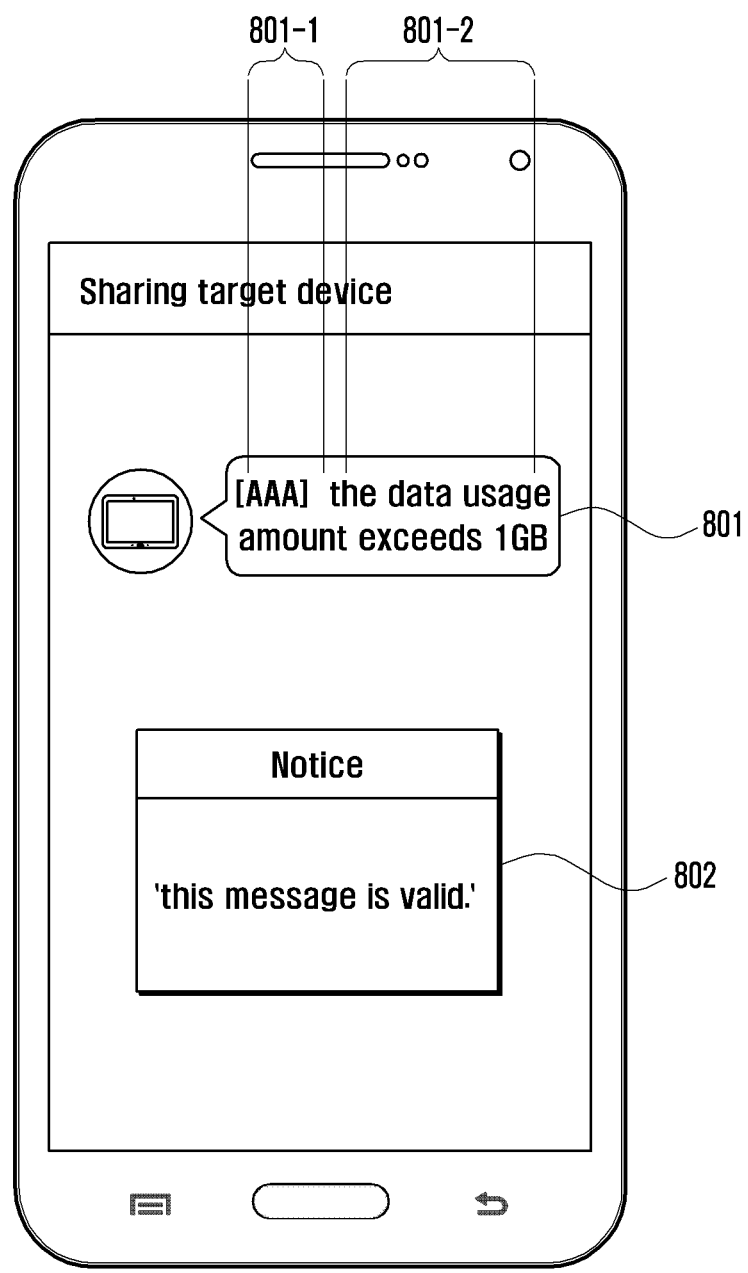
FIG. 8 illustrates an example screen displaying a data usage notification of q sharing target device according to an embodiment of the present disclosure.

FIG. 8 illustrates an example screen displaying a data usage notification of a sharing target device according to an embodiment of the present disclosure.

Referring to FIG. 8, a text message 801 including an authentication code 801-1 and notification information 801-2 are displayed through a message window.

Upon reception of the text message 801, an electronic device 601 can verify the authentication code 801-1. If the received authentication code 801-1 is the same as the authentication code generated by the authentication code generator of the electronic device 601, the electronic device 601 can determine that the notification information 801-2 is valid. Thereafter, the electronic device 601 may display a popup window 802 notifying the user that the received notification information 801-2 is valid.

Alternatively, the notification information 801-2 may be encrypted using an encryption key generated by the authentication code generator of the sharing target device 602. The electronic device 601 may decrypt the notification information 801-2 using a decryption key received from the sharing target device 602 and display the decrypted notification information 801-2 on the screen.

As another example, when a monitoring application is used for management of the sharing target device 602, upon receiving the authentication code 801-1 and the notification information 801-2, the dedicated application may display the notification information 801-2 on the screen only if the authentication code 801-1 is valid.

Referring again to FIG. 6, upon determining that the data usage amount of the sharing target device 602 is excessive, e.g., based on the notification information 801-2, the electronic device 601 transmits a service stop request message to a server of the MNO, via the base station 603, in step 617, requesting to stop the mobile communication service to the sharing target device 602.

Specifically, upon examining the data usage amount of the sharing target device 602, the user of the electronic device 601 may enter an input for requesting data usage restriction. The electronic device 601 may transmit a service stop request message to the server of the MNO via the base station 603.

Alternatively, the user of the electronic device 601 may set a maximum data usage amount to limit the data usage in advance. When the reported data usage amount of the sharing target device 602 exceeds the set maximum data usage amount, the electronic device 601 may automatically transmit a service stop request message to the server of the MNO.

The user of the electronic device 601 can transmit a service stop request message through a third-party application provided by the MNO, or the user of the electronic device 601 may make a call directly to the customer service agent of the MNO to request the suspension of the data sharing service.

In step 619, the electronic device 601 transmits a service stop request message for stopping the mobile communication service to the sharing target device 602.

In response to the service stop request message, the monitoring application managing the data usage may restrict the use of the mobile communication service of the sharing target device 602.

For example, the service stop request message may be a command or text message that can be processed by the above application. An authentication code may be sent together with the text message to verify the validity of the text message.

If the monitoring application restricts the use of the mobile communication service of the user of the sharing target device 602, the sharing target device 602 transmits, to the electronic device 601, a service stop notification message indicating that the mobile communication service to the sharing target device 602 is suspended in step 621.

The service stop notification message may be a command or text message that can be processed by the above application. An authentication code may be sent together with the text message to verify the validity of the text message.

Even when the use of the mobile communication service of the sharing target device 602 is restricted, data transmission and reception between the electronic device 601 and the sharing target device 602 using the mobile communication network may be allowed as an exceptional case in step 623. For example, in an urgent situation where the sharing target device 602 needs to use the data service, data transmission and reception between the electronic device 601 and the sharing target device 602 may be allowed so that the sharing target device 602 can transmit a data request message to the electronic device 601.

Figure 7:
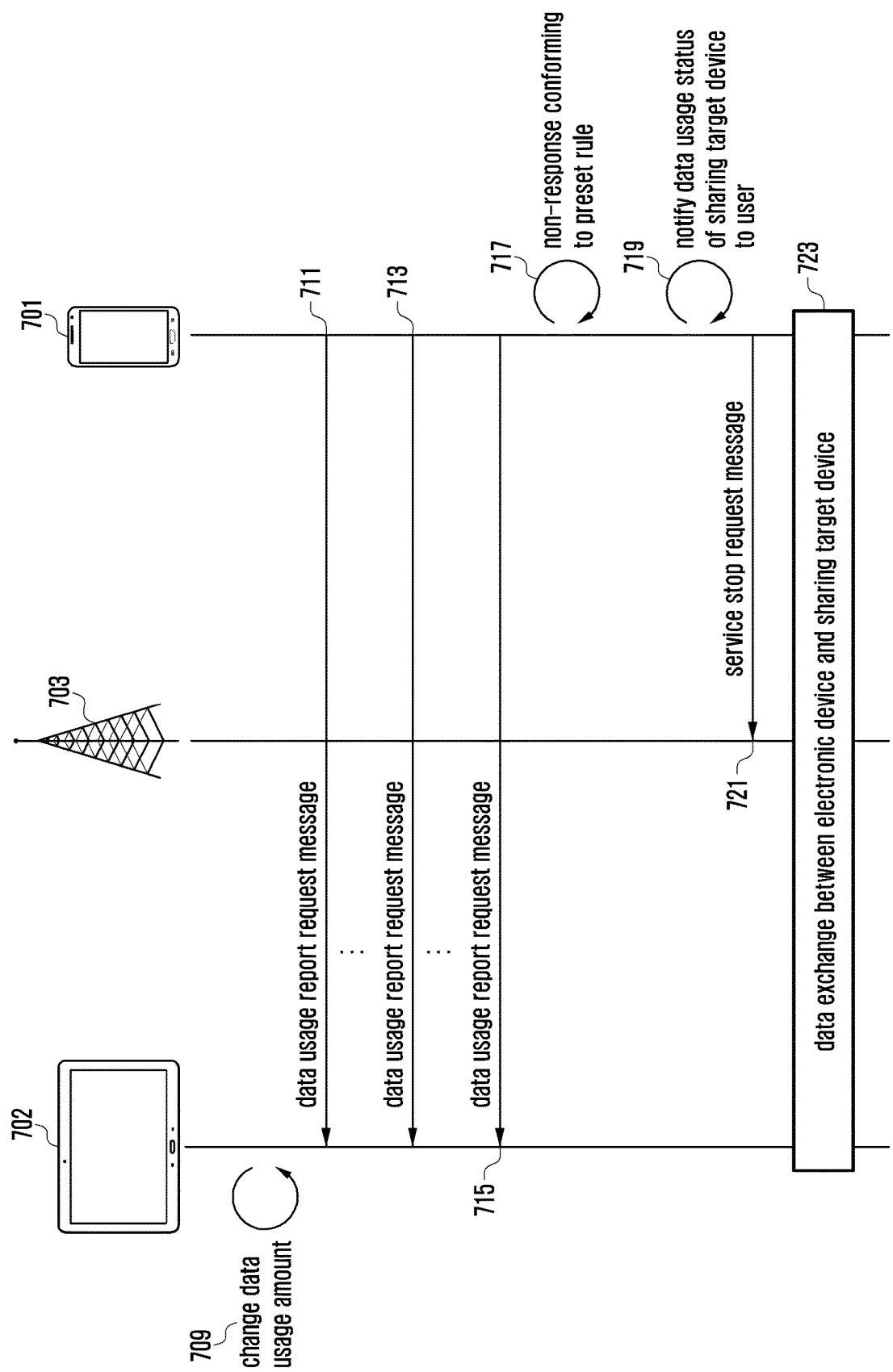

FIG. 7 is a signal flow diagram illustrating a process of limiting data usage of a sharing target device according to an embodiment of the present disclosure.

Referring to FIG. 7, in step 709, the user of the sharing target device 702 may change the preset data usage amount or may uninstall the monitoring application managing the data usage or disable the data usage restriction function.

Upon recognizing that the monitoring application of the sharing target device 702 has been deleted or the data usage has been arbitrarily manipulated, the user of the electronic device 701 may determine to limit the data usage of the sharing target device 702.

In steps 711 to 715, the electronic device 701 requests the sharing target device 702 to report data usage by periodically transmitting a data usage report request message to the sharing target device 702. For example, the data usage report request message may be transmitted at about 30-60 minute intervals. The electronic device 701 may also transmit a data usage report request message to the sharing target device 702 aperiodically according to occurrence of a user input or preset event.

The data usage report request message may be a command or text message that can be processed by the monitoring application of the sharing target device 702. An authentication code may be sent together with the text message to verify the validity of the text message.

Although the electronic device 701 has requested a data usage report on a periodic basis, the electronic device 701 detects that is has failed to receive a response in step 717. Such non-response may satisfy a preset rule. For example, a response signal may be not received from the sharing target device 702, although the electronic device 701 has transmitted the data usage request message a preset number of times (e.g., 5 to 10 times). As another example, a response signal may be not received after sending an aperiodic data usage request message.

In step 719, the electronic device 701 notifies the user of the data usage status of the sharing target device 702. For example, the electronic device 701 may provide the user with a notification message indicating the possibility of a manipulation of the data usage amount through a popup window. Upon recognizing that the data usage of the sharing target device 702 may have been manipulated, the user may enter an input for requesting the suspension of the data sharing service for the sharing target device 702.

In step 721, the electronic device 701 transmits a service stop request message to a server of an MNO, via a base station 703, in order to request a stop of the mobile communication service to the sharing target device 702. For example, the user of the electronic device 701 can transmit a service stop request message through a third-party application provided by the MNO. The user of the electronic device 701 may make a call directly to the customer service agent of the MNO to request the suspension of the data sharing service.

If the monitoring application managing the data usage of the sharing target device 702 is deactivated or deleted, it may be difficult for the user of the electronic device 701 to control the operation of the application. In this case, the electronic device 701 may directly request the mobile communication provider to restrict the mobile communication service to the sharing target device 702 in step 721.

Even when the use of the mobile communication service of the sharing target device 702 is restricted, data transmission and reception between the electronic device 701 and the sharing target device 702 using the mobile communication network may still be allowed as an exceptional case in step 723.

Figure 9:
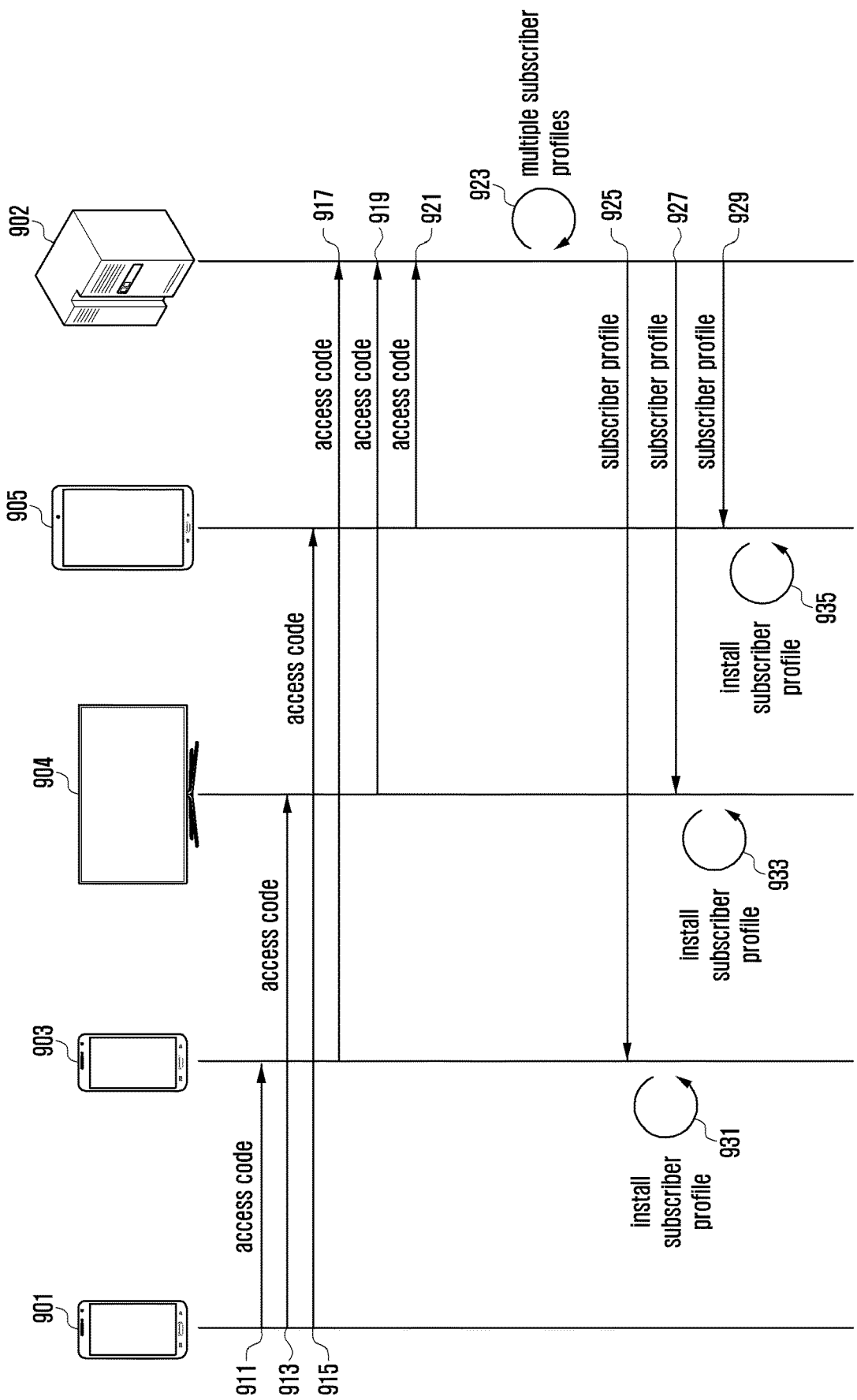
FIG. 9 is a signal flow diagram illustrating a process of configuring Internet of things (IoT) devices as sharing target devices according to an embodiment of the present disclosure.

FIG. 9 is a signal flow diagram illustrating a process of configuring IoT devices as sharing target devices according to an embodiment of the present disclosure.

Referring to FIG. 9, a user may use an electronic device 901, and a plurality of IoT devices 903, 904, and 905 may be located in an area near the user.

The IoT devices 903, 904, and 905 may be any of the types of electronic devices described above. The IoT devices 903, 904, and 905 can share the data usage amount allocated to the electronic device 901. That is, each of the IoT devices 903, 904, and 905 may be a sharing target device.

In steps 911 to 915, similar to the embodiment of FIG. 2, the electronic device 901 receives an access code from an authentication server 902 and forwards it to the IoT devices 903, 904, and 905.

Alternatively, similar to the embodiment of FIG. 3, each of the IoT devices 903, 904, and 905 receives the access code from the authentication server 902. The access code may be the same for all the IoT devices 903, 904, and 905 or may be different therefor.

In step 917 to 921, the IoT devices 903, 904, and 905 transmit their access codes to the authentication server 902.

In step 923, the authentication server 902 generates a plurality of subscriber profiles based on the received access codes. Although authentication can also be performed between the IoT devices 903, 904, and 905 and the authentication server 902, this procedure corresponds to the authentication procedure between the sharing target device and the authentication server in FIGS. 2 to 4, and a repeated description is omitted.

The subscriber profiles may include information for limiting the usage of the mobile communication service in consideration of the purposes or attributes of data usage of the IoT devices 903, 904, and 905.

In steps 925 to 929, the authentication server 902 transmits the subscriber profiles respectively to the IoT devices 903, 904, and 905.

Upon reception of the subscriber profiles, each of the IoT devices 903, 904, and 905 installs the corresponding subscriber profile in the profile storage module thereof in steps 931 to 935.

If the subscriber profile installed in the first IoT device 903 is limited to the call service only, the first IoT device 903 may receive only the call service among the mobile communication services.

If the subscriber profile installed in the second IoT device 904 is limited to the data service only, the second IoT device 904 can receive only the data service among the mobile communication services.

If the subscriber profile installed in the third IoT device 905 is configured to allow both the call service and the data service, the third IoT device 905 can receive both the data service and the call service among the mobile communication services.

The subscriber profiles for the IoT devices 903, 904, and 905 may be managed as a group profile. The electronic device 901 may manage the profiles of the IoT devices 903, 904, and 905, which share the data usage of the electronic device 901 for communication, as a group profile. The group profile may include common information and individual device information. The common information may include information about the electronic device 901, and the individual device information may include the identification information of each IoT device 903, 904, or 905.

When multiple IoT devices 903, 904, and 905 are used, the electronic device 901 can manage the amount of data consumed by the IoT devices 903, 904, and 905 in a combined manner. For example, an overall data sharing amount can be set for the IoT devices 903, 904, and 905, and the individual data usage amounts of the IoT devices 903, 904, and 905 can be combined and managed. In addition, an individual data sharing amount can be set for each IoT of the IoT devices 903, 904, and 905, and a group data sharing amount can be set for all of the IoT devices 903, 904, and 905 belonging to the group.

When one of the individual data amounts is exceeded, only the corresponding IoT device is prevented from using the data sharing service; and when the group data sharing amount is exceeded, all the IoT devices belonging to the group can be prevented from using the data sharing service.

Figure 10:
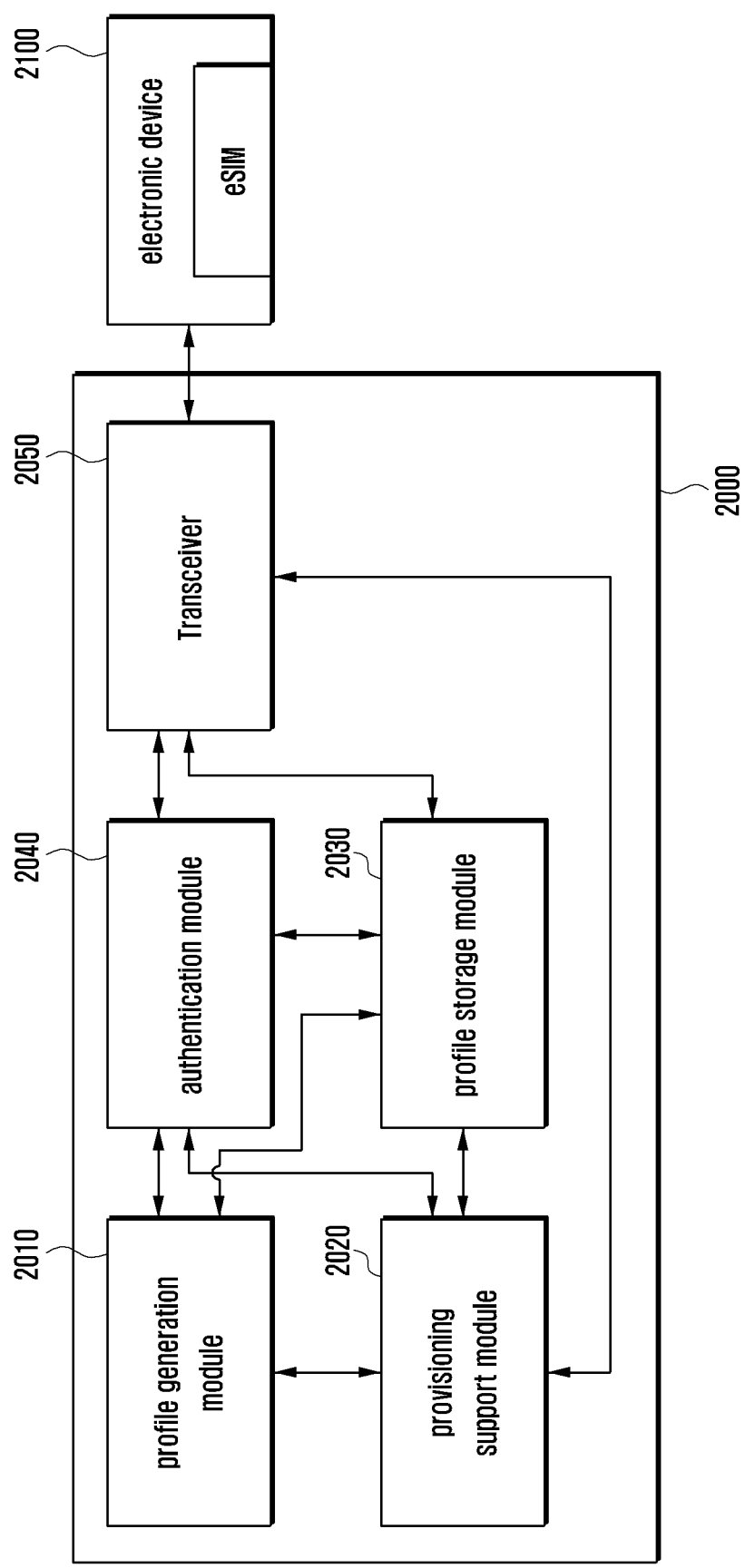
FIG. 10 illustrates an authentication server according to an embodiment of the present disclosure.

FIG. 10 illustrates an authentication server according to an embodiment of the present disclosure.

Referring to FIG. 10, the authentication server 2000 includes a profile generation module 2010, a provisioning support module 2020, a profile storage module 2030, an authentication module 2040, and a transceiver 2050.

The profile generation module 2010 may generate a subscriber profile based on a quantity of profiles, MNO information, and profile types (e.g., prepayment or deferred payment). The profile generation module 2010 may correspond to a profile generation server, and may be implemented as a physically separate server.

The provisioning support module 2020 may convert a subscriber profile composed of packets generated by the profile generation module 2010 into an uncompressed image file.

The profile storage module 2030 may store the packets generated by the profile generation module 2010 and the image file generated by the provisioning support module 2020.

The authentication module 2040 may authenticate an electronic device 2100 connected through the transceiver 2050. The authentication module 2040 may authenticate the electronic device 1100 by using a predefined key set or jig. When the electronic device 2100 is authenticated, the provisioning support module 2020 can transfer the corresponding image file stored in the profile storage module 2030 to the electronic device 2100.

When the electronic device 2100 is booted, the subscriber profile may be installed in the eSIM module, based on the received image file.

The profile generation module 2010 and the provisioning support module 2020 may be physically separated from each other so as to correspond respectively to a profile generation server and a provisioning support server. The profile generation module 2010 and the provisioning support module 2020 may transmit/receive data through a wireless communication network.

Additionally, the authentication server 2000 may further include a profile management module to manage profile installation, deletion, activation, and deactivation. The profile management module may correspond to a profile management server that transfers multiple packets received from the profile generation module 2010 to the electronic device 2100 through OTA.

Figure 11:
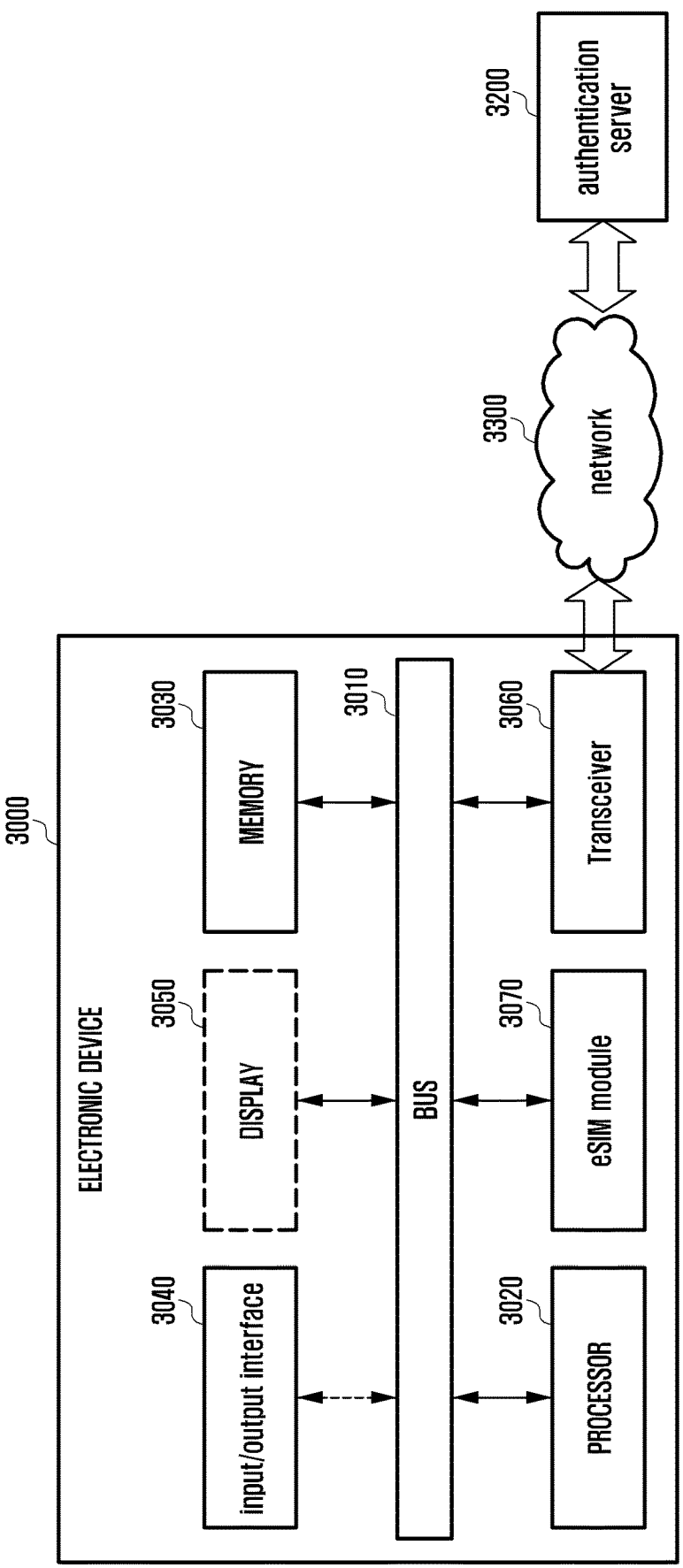
FIG. 11 illustrates an electronic device according to an embodiment of the present disclosure.

FIG. 11 illustrates an electronic device according to an embodiment of the present disclosure.

Referring to FIG. 11, an electronic device 3000 may be an electronic device that permits data sharing or a sharing target device that is allowed to share a data usage amount of another device.

The electronic device 3000 includes a bus 3010, a processor 3020, a memory 3030, an input/output interface 3040, a display 3050, a transceiver 3060, and an eSIM module 3070.

The bus 3010 may be a circuit that interconnects the above components to allow them to communicate with each other (e.g., to transmit/receive control messages).

The processor 3020 may include one or more of a CPU, an AP, and a communications processor (CP). The processor 3020 may perform control, communication, and data processing operations in relation to at least one of the components of the electronic device 3000. For example, the processor 3020 may receive a control instruction from a different component, via the bus 3010, decode the received control instruction, and perform computation or data processing according to the decoded instruction.

The processor 3020 may store a subscriber profile in the secure area of the memory 3030 based on a subscriber profile in the form of an image file received from the authentication server 3200. When the electronic device 3000 is booted, the processor 3020 may retrieve the image file from the secure area of the memory 3030 and install the same in the eSIM module 3070 as a profile.

The memory 3030 may include an internal memory or an external memory. The internal memory may include at least one of a volatile memory (e.g., a dynamic random access memory (DRAM), a static RAM (SRAM), synchronous dynamic RAM (SDRAM)) and a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory, a hard drive, or a solid state drive (SSD)). The external memory may include a flash drive such as a compact flash (CF) memory, a secure digital (SD) memory, a micro-SD memory, a mini-SD memory, an extreme digital (xD) memory, a multi-media card (MMC), or a memory stick. The external memory may be functionally or physically connected with the electronic device 3000 via various interfaces.

The memory 3030 may store the subscriber profile received from the authentication server 3200 in the secure area thereof.

The memory 3030 may store instructions or data received from or generated by the processor 3020 or other components.

The memory 3030 may store development signing keys, common signing keys, and unique identification information of the electronic device 3000. The memory 3030 may include programming modules such as the kernel, middleware, application programming interfaces (APIs) and applications. Each of the programming modules may be composed of software, firmware, hardware, or a combination thereof.

The kernel may control or manage system resources (e.g., bus 3010, processor 3020, and/or memory 3030) that are used to execute operations or functions implemented in other programming modules such as middleware, an API and an application. The kernel may also provide interfaces through which the individual components of the electronic device 3000 can be accessed, controlled, or managed by the middleware, API, or application.

The middleware can act as an intermediary enabling the API or application to communicate with the kernel for data transmission/reception. The middleware may control or manage job requests from the applications (e.g., scheduling or load balancing). For example, the middleware may assign a priority to each job request for using the system resources (e.g., bus 3010, processor 3020, or memory 3030) of the electronic device 3000.

The API is an interface for an application to control the functions provided by the kernel or middleware and may include at least one interface or function (e.g., a command) for file control, window control, image processing, and character control.

The applications may include a data usage management application for setting and displaying notification information of the present disclosure. The applications may also include an application provided by the MNO. The applications may further include a messenger application that provides a received message to the user.

The input/output interface 3040 may transfer commands or data input by the user through an input/output means (e.g., a sensor, a keyboard, a button, and/or a touchscreen) to the processor 3020, the memory 3030, and the transceiver 3060 through, e.g., the bus 3010. The input/output interface 3040 may provide a user's touch input data on the touchscreen to the processor 3020. The input/output interface 3040 may output commands or data received from the processor 3020, the memory 3030, and the transceiver 3060, via the bus 3010, to an input/output device (e.g., a speaker or the display 3050). The input/output interface 3040 may output speech data processed by the processor 3020 to the user through the speaker.

The display 3050 may include a liquid crystal display (LCD), a light emitting diode (LED) display, an organic light emitting diode (OLED) display, a microelectromechanical system (MEMS) display, or an electronic paper display.

The display 3050 may output various information (e.g., multimedia data or text data) to the user.

Alternatively, the electronic device 3000 may be implemented without the display 3050. For example, when the data usage is output as audible or tactile information through the input/output interface 3040 rather than as visual information, the display 3050 may be omitted from the electronic device 3000.

The transceiver 3060 can perform wireless communication between the electronic device 3000 and the authentication server 3200 via a network 3300.

Wireless communication may use a cellular communication technology based on at least one of, e.g., 5G, Long Term Evolution (LTE), LTE-advanced (LTE-A), code division multiple access (CDMA), wideband CDMA (WCDMA), universal mobile telecommunications system (UMTS), wireless broadband (WiBro), and global system for mobile communications (GSM). Wireless communication may also use, e.g., a wireless local area network (Wi-Fi), Bluetooth, Bluetooth low power (BLE), Zigbee, near field communication (NFC), magnetic secure transmission, radio frequency (RF), and a body area network (BAN).

The eSIM module 3070 may store the subscriber profile received from the authentication server 3200.

The transceiver 3060 may use the subscription information of the subscriber profile stored in the eSIM module 3070 to access the MNO network.

Figure 12:
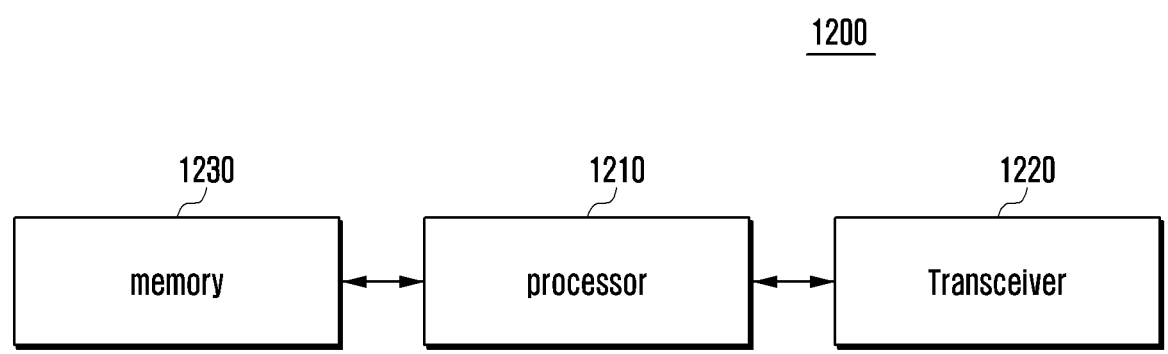
FIG. 12 illustrates an authentication server according to an embodiment of the present disclosure.

FIG. 12 illustrates an authentication server according to an embodiment of the present disclosure.

Referring to FIG. 12, the authentication server 1200 includes a processor 1210, a transceiver 1220, and a memory 1230.

The processor 1210 may include at least one of the profile generation module 2010, the provisioning support module 2020, and the authentication module 2040, e.g., as illustrated in FIG. 10. The transceiver 1220 may correspond to the transceiver 2050 of FIG. 10. The memory 1230 may correspond to the profile storage module 2030 of FIG. 10.

The memory 1230 may store instructions used to control the processor 1210.

The memory 1230 may store instructions that, when the authentication server 1200 operates, cause the processor 1210 to receive a device configuration request message for configuring a sharing target device from an electronic device or the sharing target device through the transceiver 1220; transmit, based on the device configuration request message, an access code, which permits the sharing target device to access the authentication server 1200, to the electronic device or the sharing target device through the transceiver 1220; receive the access code from the sharing target device through the transceiver 1220; and transmit, based on the received access code, a subscriber profile to the sharing target device.

The memory 1230 may store instructions that, when the authentication server 1200 operates, cause the processor 1210 to receive a device configuration request message for configuring a sharing target device from the sharing target device through the transceiver 1220; transmit, in response to the device configuration request message, a device configuration verification request message for confirming configuration of the sharing target device to the electronic device through the transceiver 1220; receive a device configuration verification confirmation message through the transceiver 1220 from the electronic device having verified the sharing target device based on the device configuration verification request message; and transmit, based on the received device configuration verification confirmation message, a subscriber profile to the sharing target device through the transceiver 1220.

In the present disclosure, the operation and configuration of the authentication server 1200 are not limited to the description of FIG. 12, and may include the operation and configuration of the server or authentication server in the embodiments described with reference to FIGS. 1 to 11.

Figure 13:
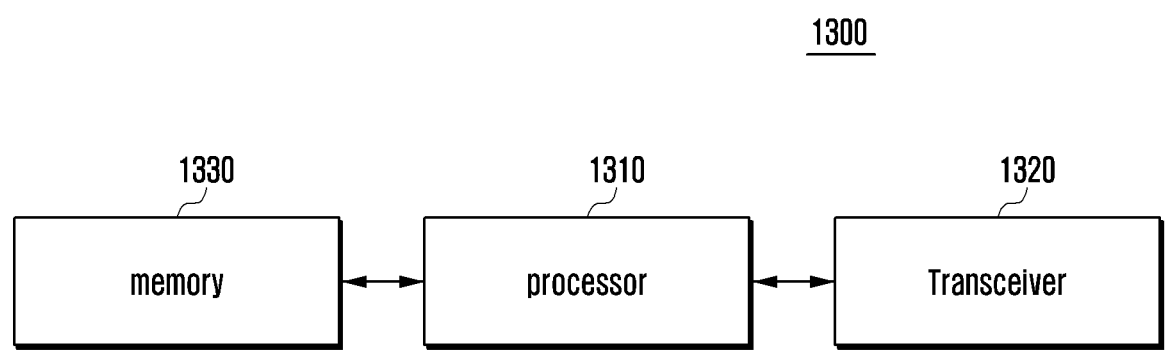
FIG. 13 illustrates an electronic device permitting data sharing according to an embodiment of the present disclosure.

FIG. 13 illustrates an electronic device permitting data sharing according to an embodiment of the present disclosure.

Referring to FIG. 13, the electronic device 1300 includes a processor 1310, a transceiver 1320, and a memory 1330.

The processor 1310 may correspond to the processor 3020 of FIG. 11, the transceiver 1320 may correspond to the transceiver 3060 of FIG. 11, and the memory 1330 may correspond to the memory 3030 of FIG. 11.

The memory 1330 may store instructions used to control the processor 1310.

The memory 1330 may store instructions that, when the electronic device 1300 operates, cause the processor 1310 to transmit a device configuration request message for configuring a sharing target device, which is allowed to share at least a portion of the data usage amount assigned to the electronic device 1300, to an authentication server through the transceiver 1320; receive, based on the device configuration request message, an access code permitting access to the authentication server from the authentication server through the transceiver 1320; and transmit the received access code to the sharing target device through the transceiver 1320, so that the sharing target device can use the access code to receive a subscriber profile from the authentication server for receiving a mobile communication service. The subscriber profile may include at least one of a phone number assigned to the sharing target device and information for limiting the usage of the mobile communication service of the sharing target device.

The memory 1330 may store instructions that cause the processor 1310 to transmit, when a trigger signal is generated for replacing the existing sharing target device with a new sharing target device, the device configuration request message to the authentication server through the transceiver 1320.

In the present disclosure, the operation and configuration of the electronic device 1300 are not limited to the description of FIG. 13, and may include the operation and configuration of the electronic device in the embodiments described with reference to FIGS. 1 to 11.

Figure 14:
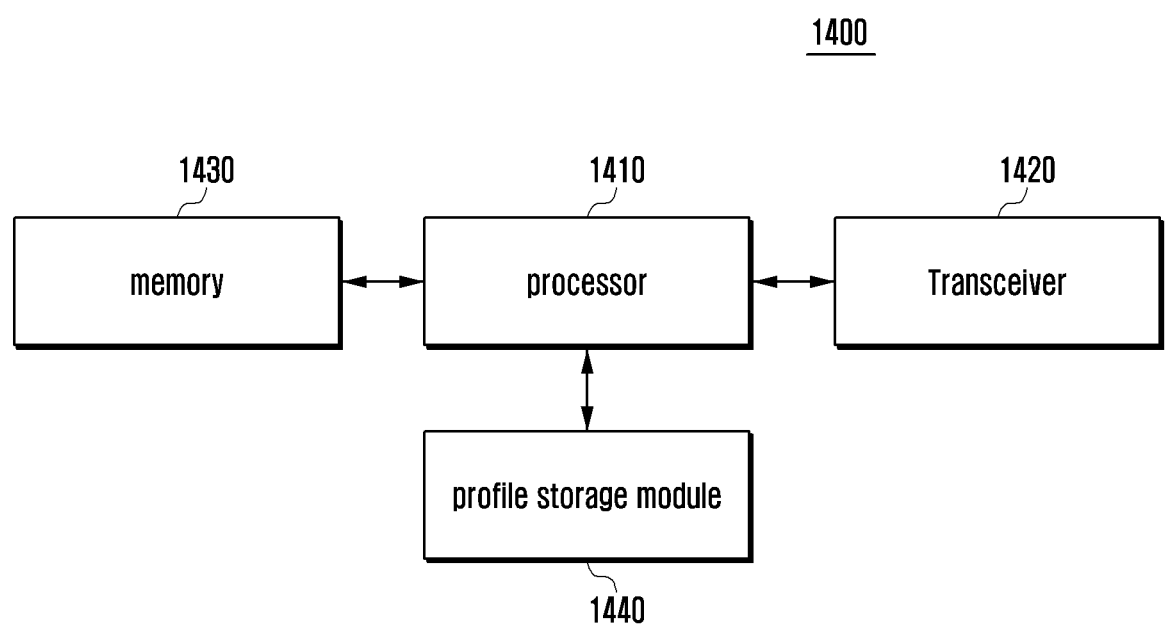
FIG. 14 illustrates a sharing target device according to an embodiment of the present disclosure.

FIG. 14 illustrates a sharing target device that shares data usage according to an embodiment of the present disclosure.

Referring to FIG. 14, the sharing target device 1400 includes a processor 1410, a transceiver 1420, a memory 1430, and a profile storage module 1430.

The processor 1410 may correspond to the processor 3020 of FIG. 11, the transceiver 1420 may correspond to the transceiver 3060 of FIG. 11, the memory 1430 may correspond to the memory 3030 of FIG. 11, and the profile storage module 1430 may correspond to the eSIM module 3070 of FIG. 11.

The memory 1430 may store instructions used to control the processor 1410.

The memory 1430 may store instructions that, when the sharing target device 1400 operates, cause the processor 1410 to receive an access code permitting access to the authentication server from an electronic device or the authentication server through the transceiver 1420; transmit the received access code to the authentication server through the transceiver 1420; receive, based on the access code, a subscriber profile from the authentication server through the transceiver 1420; store the received subscriber profile in the profile storage module 1430; and receive, based on the subscriber profile, a mobile communication service according to the amount of the data usage shared with the electronic device. The subscriber profile stored in the profile storage module 1430 may include at least one of a phone number assigned to the sharing target device and information for limiting the usage of the mobile communication service of the sharing target device.

The memory 1430 may store instructions that, when the sharing target device 1400 operates, cause the processor 1410 to transmit, through the transceiver 1420, a device configuration request message for configuring the sharing target device 1400, which is allowed to share at least a portion of the data usage amount assigned to an electronic device, to an authentication server associated with the MNO managing data usage; receive, when authentication of the sharing target device 1400 is performed between the electronic device and the authentication server based on the device configuration request message, a subscriber profile from the authentication server through the transceiver 1420; store the received subscriber profile in the profile storage module 1430; and receive, based on the subscriber profile, a mobile communication service according to the amount of the data usage shared with the electronic device.

The memory 1430 may store instructions that cause the processor 1410 to transmit, when a trigger signal is generated for replacing the existing sharing target device with a new sharing target device, the device configuration request message to the authentication server through the transceiver 1420.

In the present disclosure, the operation and configuration of the sharing target device 1400 are not limited to the description of FIG. 14, and may include the operation and configuration of the sharing target device in the embodiments described with reference to FIGS. 1 to 11.

Figure 15:
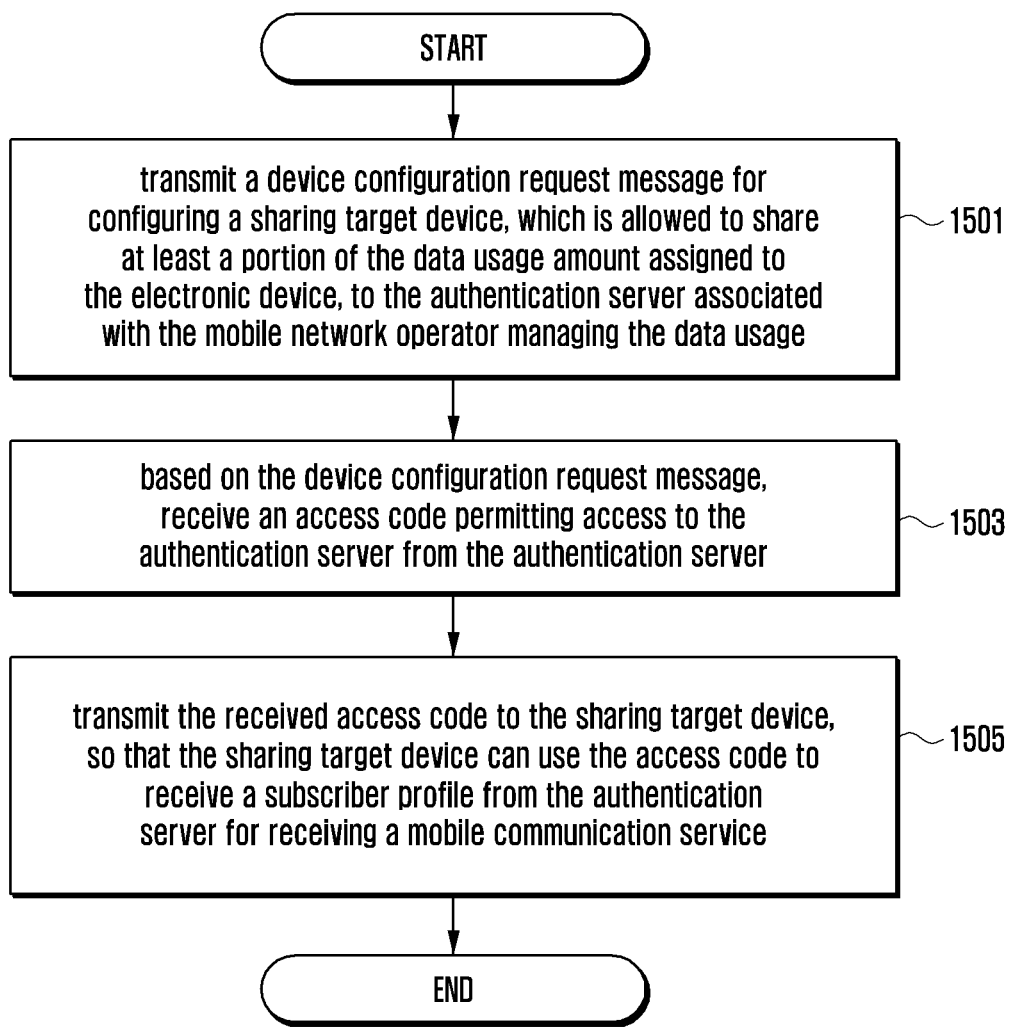
FIG. 15 is a flowchart illustrating a procedure for an electronic device to configure a sharing target device according to an embodiment of the present disclosure.

FIG. 15 is a flowchart illustrating a procedure for an electronic device to configure a sharing target device according to an embodiment of the present disclosure.

Referring to FIG. 15, in step 1501, the electronic device transmits a device configuration request message for configuring a sharing target device, which is allowed to share at least a portion of the data usage amount assigned to the electronic device, to an authentication server associated with an MNO managing the data usage. For example, when a trigger signal is generated for replacing the existing sharing target device with a new sharing target device, the electronic device may transmit the device configuration request message to the authentication server.

In step 1503, based on the device configuration request message, the electronic device receives an access code permitting access to the authentication server from the authentication server.

In step 1505, the electronic device transmits the received access code to the sharing target device, so that the sharing target device can use the access code to receive a subscriber profile from the authentication server for receiving a mobile communication service.

Figure 16:
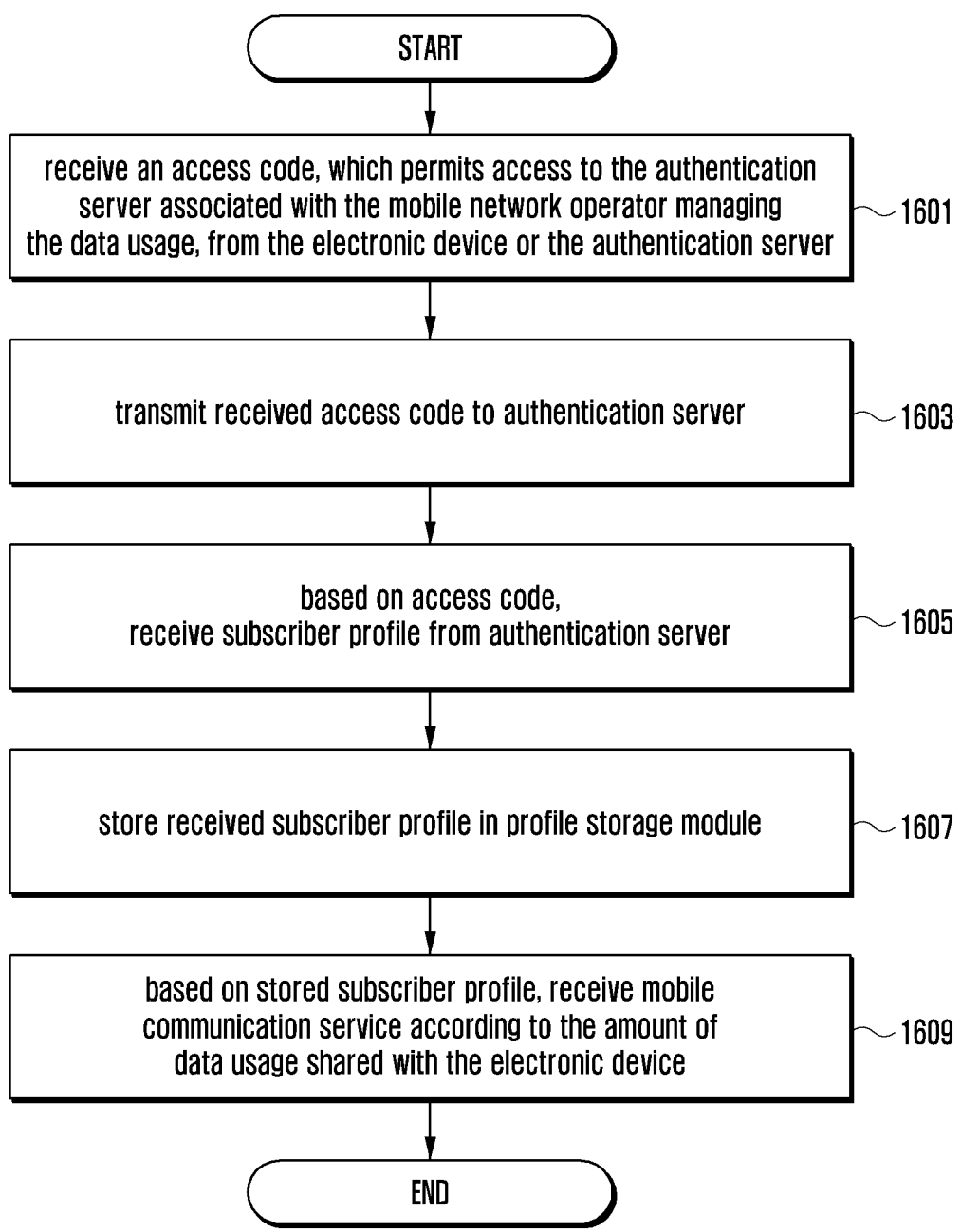
FIGS. 16 and 17 are flowcharts illustrating procedures for a sharing target device to receive a mobile communication service according to embodiments of the present disclosure.

FIG. 16 is a flowchart illustrating a procedure for a sharing target device to receive a mobile communication service according to an embodiment of the present disclosure.

Referring to FIG. 16, in step 1601, the sharing target device receives an access code, which permits access to an authentication server associated with an MNO managing the data usage, from an electronic device or the authentication server.

In step 1603, the sharing target device transmits the received access code to the authentication server.

In step 1605, based on the access code, the sharing target device receives a subscriber profile from the authentication server.

In step 1607, the sharing target device stores the received subscriber profile in the profile storage module.

In step 1609, based on the stored subscriber profile, the sharing target device receives a mobile communication service according to the amount of the data usage shared with the electronic device.

Figure 17:
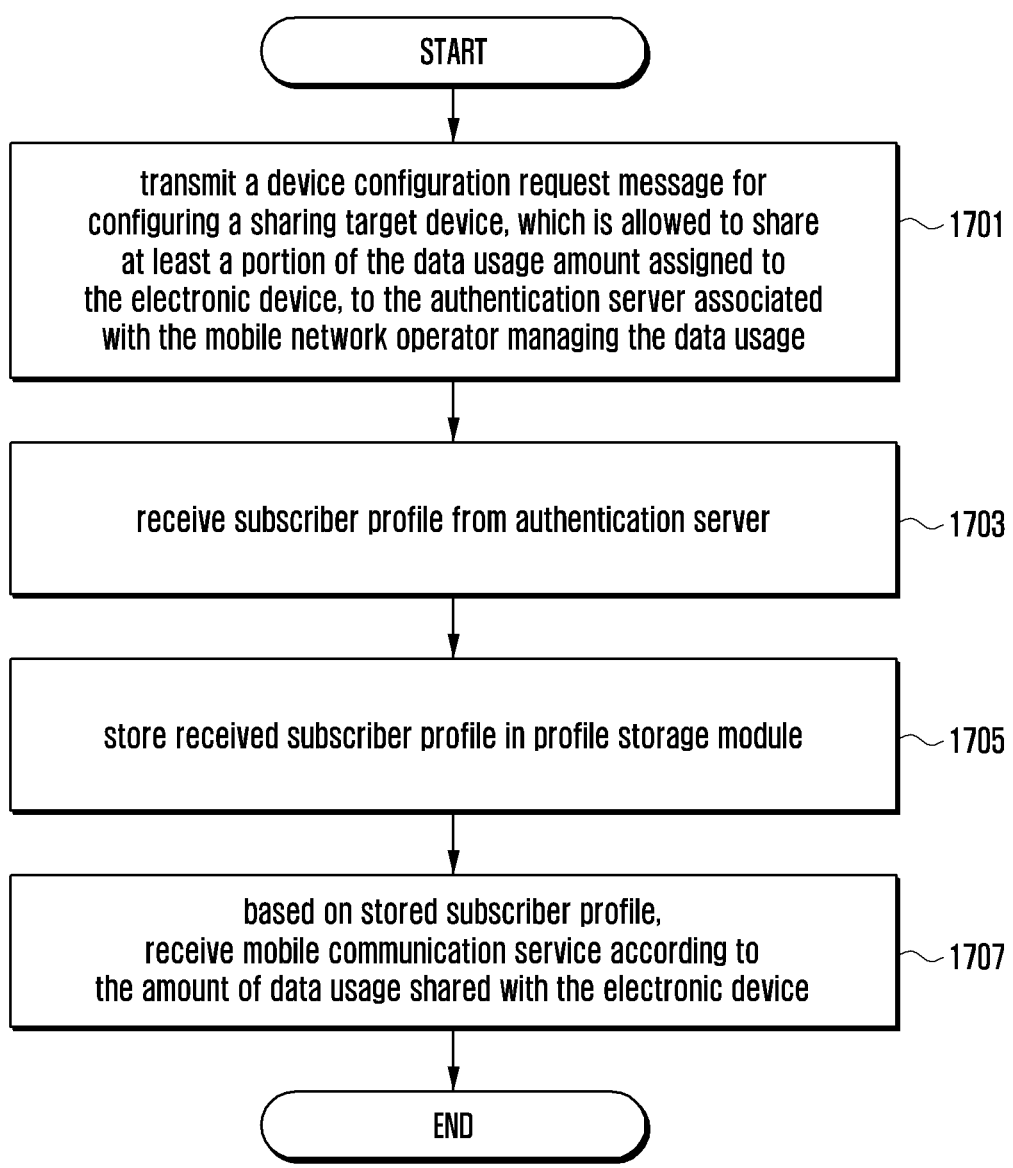

FIG. 17 is a flowchart illustrating a procedure for a sharing target device to receive a mobile communication service according to an embodiment of the present disclosure.

Referring to FIG. 17, in step 1701, the sharing target device transmits a device configuration request message for configuring a sharing target device, which is allowed to share at least a portion of the data usage amount assigned to an electronic device, to an authentication server associated with an MNO managing the data usage. For example, when a trigger signal is generated for replacing the existing sharing target device with a new sharing target device, the sharing target device may transmit the device configuration request message to the authentication server.

When authentication of the sharing target device is performed between the electronic device and the authentication server based on the device configuration request message, the sharing target device receives a subscriber profile from the authentication server in step 1703.

In step 1705, the sharing target device stores the received subscriber profile in the profile storage module.

In step 1707, based on the stored subscriber profile, the sharing target device receives a mobile communication service according to the amount of the data usage shared with the electronic device.

Figure 18:
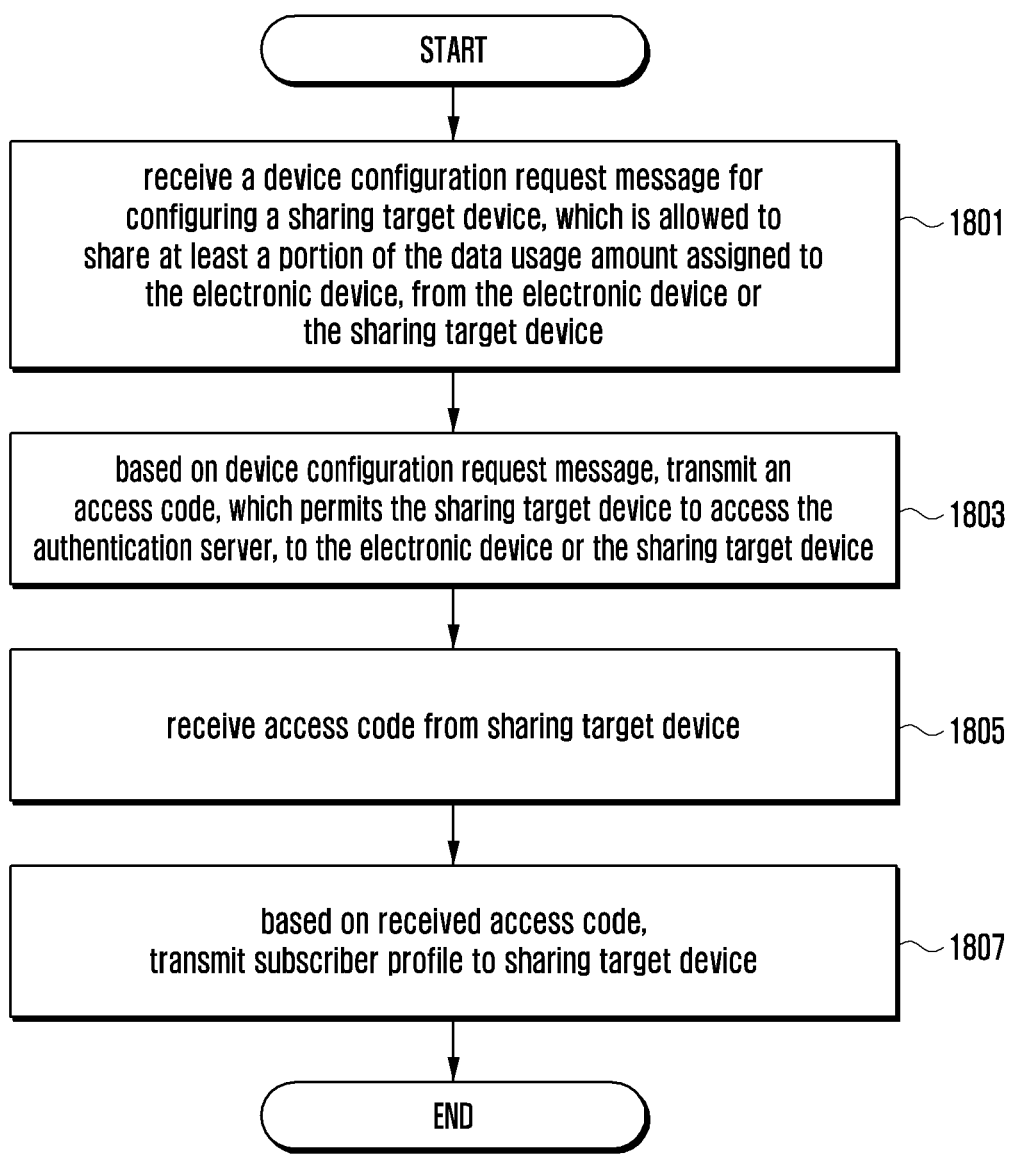
FIGS. 18 and 19 are flowcharts illustrating procedures for an authentication server to provide a subscriber profile according to embodiments of the present disclosure.

FIG. 18 is a flowchart illustrating a procedure for an authentication server to provide a subscriber profile according to an embodiment of the present disclosure.

Referring to FIG. 18, in step 1801, the authentication server receives a device configuration request message for configuring a sharing target device, which is allowed to share at least a portion of the data usage amount assigned to an electronic device, from the electronic device or the sharing target device.

In step 1803, based on the device configuration request message, the authentication server transmits an access code, which permits the sharing target device to access the authentication server, to the electronic device or the sharing target device.

In step 1805, the authentication server receives the access code from the sharing target device.

In step 1807, based on the received access code, the authentication server transmits a subscriber profile to the sharing target device.

Figure 19:
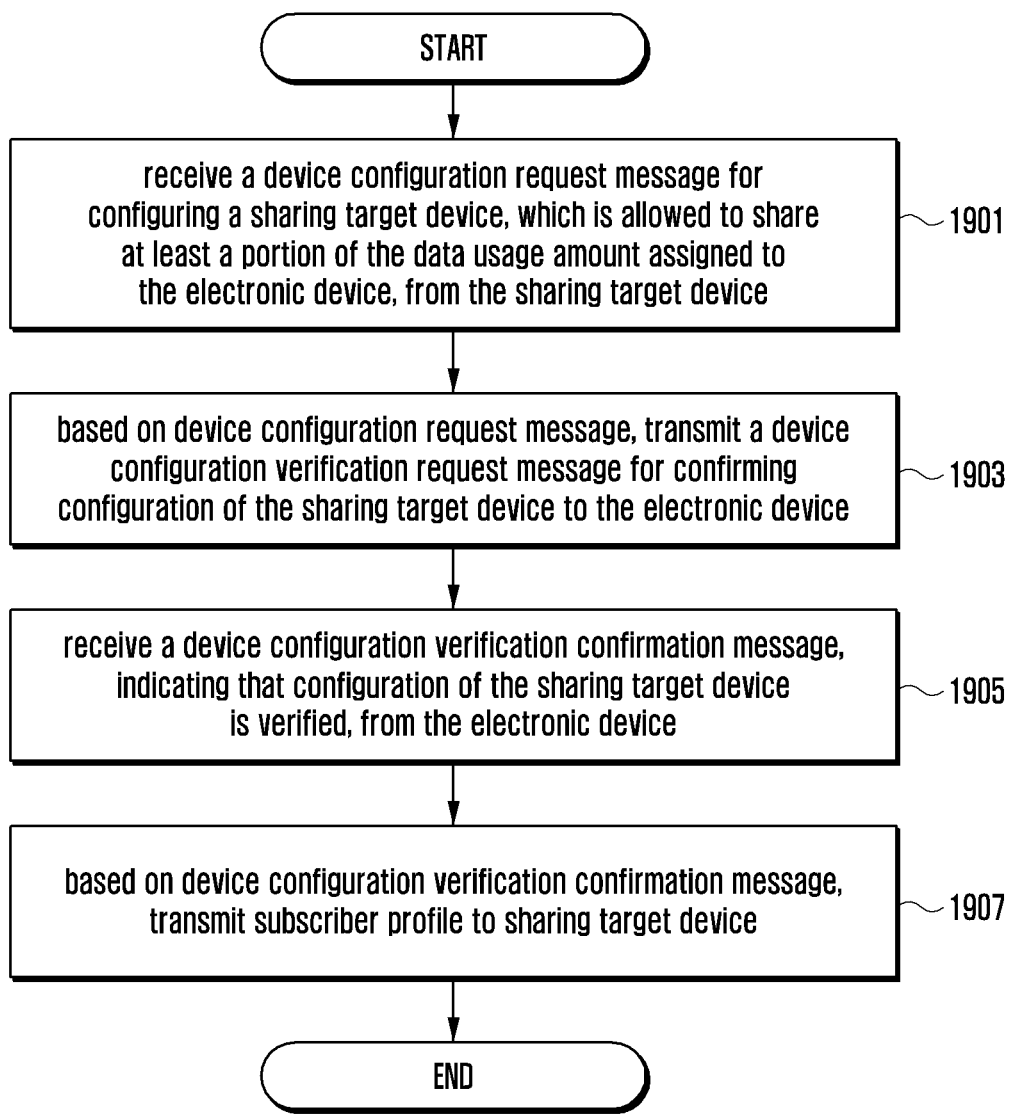

FIG. 19 is a flowchart illustrating a procedure for an authentication server to provide a subscriber profile according to an embodiment of the present disclosure.

Referring to FIG. 19, in step 1901, the authentication server receives a device configuration request message for configuring a sharing target device, which is allowed to share at least a portion of the data usage amount assigned to an electronic device, from the sharing target device.

In step 1903, based on the device configuration request message, the authentication server transmits a device configuration verification request message for confirming configuration of the sharing target device to the electronic device.

When the configuration of the sharing target device is verified by the electronic device based on the device configuration verification request message, the authentication server receives a device configuration verification confirmation message from the electronic device in step 1905.

In step 1907, based on the received device configuration verification confirmation message, the authentication server transmits a subscriber profile to the sharing target device.

At least a part of the devices (e.g., modules or functions) or the methods (e.g., operations and steps) according to the various embodiments described above may be implemented as instructions in the form of a program module, which can be stored in a computer readable storage medium. When the instructions are executed by a processor (e.g., a processor 3020), the processor may carry out functions corresponding to the instructions. The computer readable storage medium may be the memory 130.

Program modules may be stored in a non-transitory computer readable medium and can be read and executed by a computer.

A non-transitory storage medium refers to a medium that semi-permanently stores data and is readable by a processor, and may include a volatile or nonvolatile memory that temporarily stores data for computation or transmission, such as a register, cache, or buffer. However, intangible transmission media such as signals or currents are not a non-transitory storage media.

For distribution, the program modules described above may be stored in a non-transitory storage medium, such as a compact disc (CD), a DVD, a hard disk, a Blu-ray disc, a universal serial bus (USB), an internal memory of an electronic device of the present disclosure, a memory card, a ROM, or a RAM.

The program modules described above may be stored in the memory of a server and be downloaded to a terminal (e.g., an electronic device of the present disclosure) connected to the server via a network for sale, rental, offer, or transfer. The program modules may be uploaded to the server for sale, rental, offer, or transfer by the program provider (e.g., a program developer, a manager, a tester, a modifier, or a manufacturer).

When the program modules are provided to an electronic device, at least a portion of the program modules may be temporarily stored in a buffer of the server for transmission. The buffer of the server may be a non-transitory storage medium of the present disclosure.

When the program modules are provided to an electronic device for sale via a relay server (e.g., a relay server in a region in which the electronic device is located), at least a portion of the program modules may be temporarily stored in the buffer of the relay server. The buffer of the relay server may be a non-transitory storage medium of the present disclosure.

In addition, the method (e.g., steps and operations) according to an embodiment of the present disclosure may be provided as a computer program product.

The computer program product may include a non-transitory storage medium in which the program modules described above are stored.

The computer program product may refer to a product itself that may be stored in a non-transitory storage medium. The fact that a computer program product includes a non-transitory storage medium may indicate that it is possible for the computer program product to take the form of a non-transitory recording medium. That is, the computer program product may take the form of a medium that can be uploaded or downloaded or take the form of a non-transitory recording medium according to the situations. Here, the product can be an application itself sold in an electronic marketplace (e.g., Android™ market).

An execution agent and a storage agent of a computer program product may be the same or different from each other. For example, the storage agent of the computer program product may be a server, and the execution agent thereof may be a terminal.

There may be a system that includes both a computer program product and an electronic device capable of executing a function of the computer program product. In this case, the electronic device may carry out a function provided by the computer program product under the control of another device in which the computer program product is installed.

While the present disclosure has been particularly shown and described with reference to certain embodiments thereof, it will be understood by those of ordinary skill in the art that various changes in form and details may be made therein without departing from the spirit and scope of the present disclosure as defined by the following appended claims and their equivalents.

What is claimed is:

1. A method performed by an electronic device to configure a sharing target device for data sharing, the method comprising:

transmitting, to an authentication server associated with a mobile network operator for managing data usage, a device configuration request message for configuring the sharing target device to share a data usage amount assigned to the electronic device, the device configuration request message including an identifier of the sharing target device and information on a data amount to be shared for the sharing target device;

receiving, from the authentication server, in response to the device configuration request message, an access code permitting access to the authentication server; and transmitting the received access code to the sharing target device, wherein a subscriber profile to be installed in an embedded universal integrated circuit card (eUICC) of the sharing target device is generated in case that an authentication is completed between the sharing target device and the authentication server based on the access code, wherein the subscriber profile is used for sharing the data usage amount assigned to the electronic device, and wherein the access code includes at least one of information requesting assignment of a portion of the data usage amount assigned to the electronic device, and information identifying the electronic device.

2. The method of claim 1, wherein the device configuration request message is transmitted to the authentication server, in case that a trigger signal is generated for replacing an existing sharing target device with the sharing target device.

3. The method of claim 1, wherein the subscriber profile comprises at least one of:
a phone number assigned to the sharing target device; and
information for limiting usage of a mobile communication service received by the sharing target device.

4. A method performed by a sharing target device to share a data usage amount assigned to an electronic device, the method comprising:
receiving an access code, which permits access to an authentication server associated with a mobile network operator managing data usage, from the electronic device or the authentication server;
transmitting the received access code to the authentication server;
receiving, based on the access code, a subscriber profile from the authentication server;
installing the received subscriber profile in an embedded universal integrated circuit card (eUICC) of the sharing target device; and
using, based on the stored subscriber profile, the data usage amount assigned to the electronic device,
wherein a device configuration request message including an identifier of the sharing target device and information on a data amount to be shared for the sharing target device is transmitted from the electronic device to the authentication server for obtaining the access code,
wherein the subscriber profile is generated in case that an authentication is completed between the sharing target device and the authentication server based on the access code, and
wherein the access code includes at least one of information requesting assignment of a portion of the data usage amount assigned to the electronic device, and information identifying the electronic device.

5. The method of claim 4, wherein the subscriber profile comprises at least one of:
a phone number assigned to the sharing target device; and
information for limiting usage of a mobile communication service received by the sharing target device.

6. A method for an authentication server associated with a mobile network operator to provide a subscriber profile, the method comprising:
receiving, from an electronic device, a device configuration request message for configuring the sharing target device to share a data usage amount assigned to the electronic device, the device configuration request message including an identifier of the sharing target device and information on a data amount to be shared for the sharing target device;

transmitting, in response to the device configuration request message, an access code, which permits the sharing target device to access the authentication server, to the electronic device or the sharing target device;

receiving the access code from the sharing target device;

generating the subscriber profile to be installed in an embedded universal integrated circuit card (eUICC) of the sharing target device in case that an authentication is completed between the sharing target device and the authentication server based on the access code; and transmitting the subscriber profile to the sharing target device, wherein the subscriber profile is used for sharing the data usage amount assigned to the electronic device, and wherein the access code includes at least one of information requesting assignment of a portion of the data usage amount assigned to the electronic device, and information identifying the electronic device.

7. An electronic device capable of sharing a data usage amount assigned to the electronic device with a sharing target device, the electronic device comprising:
a transceiver; and
a hardware processor configured to:
transmit, to an authentication server via the transceiver, a device configuration request message for configuring the sharing target device to share the data usage amount assigned to the electronic device, the device configuration request message including an identifier of the sharing target device and information on a data amount to be shared for the sharing target device;
receive, from the authentication server via the transceiver, in response to the device configuration request message, an access code permitting access to the authentication server; and
transmit the received access code to the sharing target device via the transceiver,
wherein a subscriber profile to be installed in an embedded universal integrated circuit card (eUICC) of the sharing target device is generated in case that an authentication is completed between the sharing target device and the authentication server based on the access code,
wherein the subscriber profile is used for sharing the data usage amount assigned to the electronic device, and
wherein the access code includes at least one of information requesting assignment of a portion of the data usage amount assigned to the electronic device, and information identifying the electronic device.

8. The electronic device of claim 7, wherein the device configuration request message is transmitted to the authentication server in case that a trigger signal is generated for replacing an existing sharing target device with the sharing target device.

9. The electronic device of claim 7, wherein the subscriber profile comprises at least one of:
a phone number assigned to the sharing target device; and
information for limiting usage of a mobile communication service received by the sharing target device.

10. A sharing target device that shares a data usage amount assigned to an electronic device, the sharing target device comprising:
a transceiver;

an embedded universal integrated circuit card (eUICC); and
a hardware processor configured to:
receive, from the electronic device or the authentication server via the transceiver, an access code permitting access to the authentication server;
transmit the received access code to the authentication server via the transceiver;
receive, based on the access code, a subscriber profile from the authentication server via the transceiver;
install the received subscriber profile in the eUICC; and
use, based on the stored subscriber profile, the data usage amount assigned to the electronic device,
wherein a device configuration request message including an identifier of the sharing target device and information on a data amount to be shared for the sharing target device is transmitted from the electronic device to the authentication server for obtaining the access code,
wherein the subscriber profile is generated in case that an authentication is completed between the sharing target device and the authentication server based on the access code, and
wherein the access code includes at least one of information requesting assignment of a portion of the data usage amount assigned to the electronic device, and information identifying the electronic device.

11. The sharing target device of claim 10, wherein the subscriber profile comprises at least one of:
a phone number assigned to the sharing target device; and
information for limiting usage of a mobile communication service received by the sharing target device.

12. An authentication server associated with a mobile network operator, the authentication server comprising:
a transceiver; and
a hardware processor configured to:
receive, from the electronic device via the transceiver, a device configuration request message for configuring the sharing target device to share a data usage amount assigned to the electronic device, the device configuration request message including an identifier of the sharing target device and information on a data amount to be shared for the sharing target device;
transmit, to the electronic device or the sharing target device via the transceiver, in response to the device configuration request message, an access code, which permits the sharing target device to access the authentication server;
receive the access code from the sharing target device via the transceiver;
generate the subscriber profile to be installed in an embedded universal integrated circuit card (eUICC) of the sharing target device in case that an authentication is completed between the sharing target device and the authentication server based on the access code; and
transmit the subscriber profile to the sharing target device,
wherein the subscriber profile is used for sharing the data usage amount assigned to the electronic device, and
wherein the access code includes at least one of information requesting assignment of a portion of the data usage amount assigned to the electronic device, and information identifying the electronic device.

* * * * *